US011416535B2

(12) United States Patent
Counts et al.

(10) Patent No.: US 11,416,535 B2
(45) Date of Patent: Aug. 16, 2022

(54) USER INTERFACE FOR VISUALIZING SEARCH DATA

(71) Applicant: Microsoft Technology Licensing, LLC, Redmond, WA (US)

(72) Inventors: Scott Counts, Redmond, WA (US); Roberta R. Moeur, Redmond, WA (US); Curtis N. von Veh, Redmond, WA (US); Justin Brooks Cranshaw, Seattle, WA (US); Stevie Nicole Chancellor, Atlanta, GA (US); Anthony Carbary, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 108 days.

(21) Appl. No.: 16/378,198

(22) Filed: Apr. 8, 2019

(65) Prior Publication Data

US 2019/0324981 A1 Oct. 24, 2019

Related U.S. Application Data

(60) Provisional application No. 62/660,887, filed on Apr. 20, 2018.

(51) Int. Cl.
*G06F 3/048* (2013.01)
*G06F 16/35* (2019.01)
(Continued)

(52) U.S. Cl.
CPC .......... *G06F 16/358* (2019.01); *G06F 3/0481* (2013.01); *G06F 16/335* (2019.01);
(Continued)

(58) Field of Classification Search
CPC .. G06F 16/3329; G06F 16/35; G06F 16/3347; G06F 16/353; G06F 16/285;
(Continued)

(56) References Cited

U.S. PATENT DOCUMENTS 7,240,049 B2   7/2007  Kapur
7,840,538 B2   11/2010 Joshi et al.
(Continued)

OTHER PUBLICATIONS

Keegan, et al., "CHI-nnabis: Implications of Marijuana Legalization for and from Human-Computer Interaction", In Proceedings of the CHI Conference Extended Abstracts on Human Factors in Computing Systems, May 6, 2017, pp. 1312-1317.
(Continued)

*Primary Examiner* — Aleksey Olshannikov
(74) *Attorney, Agent, or Firm* — Newport IP, LLC; Benjamin A. Keim

(57) ABSTRACT

A user interface (UI) for visualizing search data provides techniques for grouping and organizing aggregate data that shows the categories of topics included in search queries from a large number of individual users. Raw search queries are categorized into one of a number of topical categories. The search queries are assigned to a geographic location based on geolocations of computing devices generating the search queries. The UI presents a map that shows the number of search queries per topical category for each geographic location displayed in the current UI view. As a result of this UI design, a user can easily understand the interaction between geographic location and frequency of search query topics. Trends in the geographic distribution of searches and in the categories of topics searched are also easily understood from this UI design by changing the time range of the search queries displayed.

20 Claims, 22 Drawing Sheets

(51) Int. Cl.

| | |
|---|---|
| *G06F 16/9537* | (2019.01) |
| *G06F 3/0481* | (2022.01) |
| *G06K 9/62* | (2022.01) |
| *G06N 20/10* | (2019.01) |
| *G06F 16/335* | (2019.01) |
| *G06F 40/211* | (2020.01) |

(52) U.S. Cl.
CPC ........ *G06F 16/9537* (2019.01); *G06F 40/211* (2020.01); *G06K 9/628* (2013.01); *G06N 20/10* (2019.01)

(58) Field of Classification Search
CPC ............... G06F 16/9535; G06F 16/248; G06F 16/3344; G06F 16/9537; G06F 2216/03; G06F 16/951; G06F 16/334; G06F 16/8365; G06F 16/3335; G06F 16/9532
See application file for complete search history.

(56) References Cited

U.S. PATENT DOCUMENTS

| | | | | |
|---|---|---|---|---|
| 8,145,623 | B1* | 3/2012 | Mehta | G06F 16/355 707/713 |
| 9,767,182 | B1* | 9/2017 | Thakur | G06F 16/951 |
| 9,798,820 | B1* | 10/2017 | Premont-Schwarz | G06F 16/9535 |
| 10,409,866 | B1* | 9/2019 | Cheng | G06F 16/951 |
| 2002/0080187 | A1* | 6/2002 | Lawton | G06F 16/951 715/810 |
| 2006/0271280 | A1* | 11/2006 | O'Clair | G06F 16/9537 701/455 |
| 2007/0255552 | A1* | 11/2007 | Thiesson | G06F 16/9535 704/8 |
| 2008/0256444 | A1* | 10/2008 | Wang | G06F 16/951 715/700 |
| 2010/0169327 | A1* | 7/2010 | Lindsay | H04L 51/00 707/750 |
| 2013/0297694 | A1* | 11/2013 | Ghosh | H04L 67/02 709/204 |
| 2015/0169582 | A1* | 6/2015 | Jain | G06F 16/2468 707/748 |
| 2015/0169596 | A1* | 6/2015 | Sidorska | G06F 16/9537 707/724 |
| 2017/0032298 | A1 | 2/2017 | de ghellinck et al. | |
| 2019/0073379 | A1* | 3/2019 | Giuffrida | G06F 16/9537 |

OTHER PUBLICATIONS

Kim, et al., "Nowcasting commodity prices using social media. PeerJ", In PeerJ Computer Science, vol. 3, Jul. 31, 2017, pp. 1-21.

Kroft, et al., "Does online search crowd out traditional search and improve matching efficiency Evidence from Craigslist", In Journal of Labor Economics, vol. 32, No. 2, Apr. 2014, pp. 259-303.

Kuhn, et al., "Is Internet job search still ineffective", In Economic Journal, vol. 124, Issue 581, Dec. 2014, pp. 1213-1233.

Kurekova, et al., "Using Internet Data to Analyse the Labour Market: A Methodological Enquiry", In Discussion Paper Series No. 8555, Oct. 2014, 26 Pages.

Lazar, et al., "Human-computer interaction and international public policymaking: a framework for understanding and taking future actions", In Journal of Foundations and Trends in Human-Computer Interaction, vol. 9, Issue 2, May 1, 2016, 84 Pages.

Lazar, Jonathan, "Public policy and HCI: making an impact in the future:", In Journal of Magazine Interaction, vol. 22, Issue 5, Sep. 2015, pp. 69-71.

Lazer, et al., "Life in the network: the coming age of computational social science", In Journal of Science, vol. 323, Feb. 6, 2009, pp. 1-9.

Lazer, et al., "The parable of Google Flu: traps in big data analysis", In Journal of Science, vol. 343, Issue 6176, Mar. 14, 2014, 9 Pages.

Lindsay, et al., "Alternative Job Search Strategies in Remote Rural and Peri-urban Labour Markets: The Role of Social Networks", In Journal of Sociologia Ruralis, vol. 45, Issue 1-2, Apr. 11, 2005, pp. 53-70.

Luo, Michael, "Job Retraining May Fall Short of High Hopes", In Publication of New York Times, Jul. 5, 2009, 5 Pages.

Malizia, et al., "The influence of economic diversity on unemployment and stability", In Journal of Regional Science, vol. 33, Issue 2, May 1, 1993.

Mao, et al., "Predicting financial markets: Comparing survey, news, twitter and search engine data", In Journal of Computing Research Repository, Dec. 2011, pp. 1-10.

Mao, et al., "Quantifying the effects of online bullishness on international financial markets", In Technical Report of ECB Statistics Paper 9, Jul. 2015, 24 Pages.

Matthews, et al., "Social capital, labour markets, and job-finding in urban and rural regions: Comparing paths to employment in prosperous cities and stressed rural communities in Canada", In Journal of Sociological Review, vol. 57, Issue 2, May 2009, pp. 306-330.

McFadyen, et al., "Economic and psychological models of job search behavior of the unemployed", In Journal of Human Relations, vol. 50, Issue 12, Dec. 1997.

Mikolov, et al., "Distributed representations of words and phrases and their compositionality", In Proceedings of the 26th International Conference on Neural Information Processing Systems, vol. 2, Dec. 5, 2013, pp. 1-9.

Morris, et al., "A Comparison of Information Seeking Using Search Engines and Social Networks", In Proceedings of the Fourth International Conference on Weblogs and Social Media, May 23, 2010, 4 Pages.

Paul, et al., "Diagnoses, decisions, and outcomes: Web search as decision support for cancer", In Proceedings of the 24th International Conference on World Wide Web, May 18, 2015, pp. 831-841.

Paul, et al., "Search and breast cancer: On episodic shifts of attention over life histories of an illness", In Journal of ACM Transactions on the Web, vol. 10, Issue 2, May 2016, 27 Pages.

Pavlicek, et al., "Nowcasting unemployment rates with google searches: Evidence from the visegrad group countries", In Journal of PLoS One, vol. 10, Issue 5, May 22, 2015, 11 Pages.

Preis, et al., "Complex dynamics of our economic life on different scales: insights from search engine query data", In Journal of Philosophical Transactions of the Royal Society A, vol. 368, Dec. 28, 2010, pp. 5707-5719.

Preis, et al., "Quantifying trading behavior in financial markets using Google Trends", In Journal of Scientific reports, vol. 3, Apr. 25, 2013, pp. 1-6.

Ripberger, Joseph T., "Capturing Curiosity: Using Internet Search Trends to Measure Public Attentiveness", In Policy Studies Journal, vol. 39, Issue 2, May 2, 2011, 2 Pages.

Smith, et al., "Analyzing Computer Programming Job Trend Using Web Data Mining", In Proceedings of Issues in Informing Science and Information Technology, vol. 11, Jan. 2014, pp. 203-214.

Smith, Aaron, "Searching for work in the digital era", In Publication of Pew Research Center, Nov. 19, 2015, 3 Pages.

Sokolova, et al., "A systematic analysis of performance measures for classification tasks", In Journal of Information Processing and Management, vol. 45, No. 4, Jul. 2009, pp. 427-437.

Taylor, et al., "Emerging practices and perspectives on Big Data analysis in economics: Bigger and better or more of the same?", In Journal of Big Journal of Big Data & Society, vol. 1, Issue 2, Jul. 1, 2014, pp. 1-10.

Tefft, Nathan, "Insights on unemployment, unemployment insurance, and mental health", In Journal of Health Economics, vol. 30, Issue 2, Mar. 2011, pp. 258-264.

Thebault-Spieker, et al., "Toward a Geographic Understanding of the Sharing Economy: Systemic Biases in UberX and TaskRabbit", In Journal of ACM Transactions on Computer-Human Interaction, vol. 24, No. 3, Jul. 2017, 40 Pages.

Utz, Sonja, "Is LinkedIn making you more successful? The informational benefits derived from public social media", In Journal of New Media & Society, vol. 18, No. 11, Dec. 2016, pp. 2685-2702.

Varian, Hal R., "Big data: New tricks for econometrics", In Journal of Economic Perspectives, vol. 28, Issue 2, May 2014, pp. 3-28.

(56) References Cited

OTHER PUBLICATIONS

Vishwanath, Tara, "Job search, stigma effect, and escape rate from unemployment", In Journal of Labor Economics, vol. 7, Issue 4, Oct. 1989.
Wanberg, et al., "Predictors and outcomes of networking intensity among unemployed job seekers", In Journal of Applied Psychology, vol. 85, Issue 4, Aug. 2000, pp. 491-503.
Wanberg, Connie R., "The individual experience of unemployment", In Journal of Annual Review of Psychology, vol. 63, Jan. 10, 2012, pp. 369-396.
White, et al., "Exploratory search: Beyond the query-response paradigm", In Journal of Synthesis lectures on information concepts, retrieval, and services, vol. 1, Issue 1, Jan. 2009, 108 Pages.
Witte, Hans De, "Job insecurity and psychological well-being: Review of the literature and exploration of some unresolved issues", In European Journal of work and Organizational psychology, vol. 8, Issue 2, Jun. 1999, pp. 155-177.
Yang, et al., "Self-Disclosure and Channel Difference in Online Health Support Groups", In Proceedings of the Eleventh International Conference on Web and Social Media, May 15, 2017, pp. 704-707.
"Databases, Tables & Calculators by Subject", Retrieved from: https://data.bls.gov/timeseries/LNS14000000, Retrieved on: Apr. 20, 2018, 2 Pages.
"Experimenting with the Research Paper", Retrieved from: http://livescience-jobs.azurewebsites.net/?key=billings, Retrieved on: Apr. 20, 2018, 1 Page.
"Statistical Guide for Recruiters: 50 HR and Recruiting Statistics for 2017", Retrieved from: https://web.archive.org/web/20170712214249/http:/resources.glassdoor.com/rs/899-LOT-464/images/50hr-recruiting-and-statistics-2017.pdf, Jul. 12, 2017, pp. 1-16.
"Table B-1. Employees on nonfarm payrolls by industry sector and selected industry detail", Retrieved from: https://www.bls.gov/news.release/empsit.t17.htm, Retrieved on: Apr. 20, 2018, 7 Pages.
Alkhatib, et al., "Examining crowd work and gig work through the historical lens of piecework", In Proceedings of the Conference on Human Factors in Computing Systems, May 6, 2017, pp. 4599-4616.
Askitas, et al., "Google econometrics and unemployment forecasting", In Journal of Applied Economics Quarterly, vol. 55, Issue 2, Jun. 2009, pp. 107-120.
Asur, et al., "Predicting the future with social media", In Proceedings of the IEEE/WIC/ACM International Conference on Web Intelligence and Intelligent Agent Technology, vol. 1, Aug. 31, 2010, 8 Pages.
Awadallah, et al., "Supporting complex search tasks", In Proceedings of the 23rd ACM International Conference on Conference on Information and Knowledge Management, Nov. 3, 2014, pp. 829-838.
Baker, et al., "The Impact of Unemployment Insurance on Job Search: Evidence from Google Search Data", In Journal of Review of Economics and Statistics, Oct. 25, 2014, 48 Pages.
Balakrishnan, Anita, "Self-driving cars could cost America's professional drivers up to 25,000 jobs a month, Goldman Sachs says", Retreived from: https://www.cnbc.com/2017/05/22/goldman-sachs-analysis-of-autonomous-vehicle-job-loss.html, May 22, 2017, 8 Pages.
Balduzzi, et al., "Economic news and bond prices: Evidence from the US Treasury market", In Journal of financial and Quantitative analysis, vol. 36, Issue 4, Dec. 2001, pp. 523-543.
Bederson, et al., "Workshop on SIGCHI public policy", In Proceedings of Extended Abstracts on Human Factors in Computing Systems, Apr. 22, 2006, pp. 1655-1657.
Blau, et al., "Job search outcomes for the employed and unemployed", In Journal of Political Economy, vol. 98, Issue 3, Jun. 1, 1990, pp. 637-655.
Blumenstock, Joshua Evan, "Fighting poverty with data", In Journal of Science, vol. 353, Issue 6301, Aug. 19, 2016, pp. 753-754.
Bollen, et al., "Twitter mood predicts the stock market", In Journal of Computational Science, vol. 2, Issue 1, Mar. 1, 2011, 8 Pages.
Bordino, et al., "Web search queries can predict stock market volumes", In Journal of PloS one, vol. 7, Issue 7, Jul. 19, 2012, pp. 1-17.
Boyd, et al., "Critical questions for big data: Provocations for a cultural, technological, and scholarly phenomenon", In Journal of Information, Communication & Society, vol. 15, Issue 5, Jun. 2012, pp. 662-679.
Burke, et al., "Using Facebook after losing a job: Differential benefits of strong and weak ties", In Proceedings of the conference on Computer supported cooperative work, Feb. 23, 2013, pp. 1419-1430.
Burt, Ronald S., "Structural holes: The social structure of competition", In Publication of Harvard university press, Jun. 30, 2009, pp. 57-91.
Chancellor, et al., "Measuring Employment Demand Using Internet Search Data", In Proceedings of Conference on Human Factors in Computing Systems, Apr. 21, 2018, 14 Pages.
Chancellor, et al., "Multimodal Classification of Moderated Online Pro-Eating Disorder Content", In Proceedings of the Conference on Human Factors in Computing Systems, May 6, 2017, pp. 3213-3226.
Choi, et al., "Predicting the present with Google Trends", In Journal of Economic Record, vol. 88, Issue S1, Jun. 2012, 23 Pages.
Choudhury, et al., "Seeking and sharing health information online: Comparing search engines and social media", In Proceedings of the 32nd annual ACM conference on Human factors in computing systems, Apr. 26, 2014, pp. 1365-1376.
Culey, Sean, "Revitalizing the Rust Belt", Retrieved from: https://www.forbes.com/sites/realspin/2017/09/08/revitalizing-the-rust-belt/6/#7659ae493653, Sep. 8, 2017, 3 Pages.
Culotta, Aron, "Estimating county health statistics with twitter", In Proceedings of the 32nd annual ACM conference on Human factors in computing systems, Apr. 26, 2014, pp. 1335-1344.
D'Amuri, et al., "'Google It!' Forecasting the US Unemployment Rate with a Google Job Search Index", In FEEM Working Paper No. 31.2010, Apr. 22, 2010, 5 Pages.
Desilver, Drew, "Most Americans unaware that as U.S. manufacturing jobs have disappeared, output has grown", Retreived from: http://www.pewresearch.org/fact-tank/2017/07/25/most-americans-unaware-that-as-u-s-manufacturing-jobs-have-disappeared-output-has-grown/, Jul. 25, 2017, 6 Pages.
Dillahunt, et al., "Designing for disadvantaged job seekers: Insights from early investigations", In Proceedings of the ACM Conference on Designing Interactive Systems, Jun. 4, 2016, pp. 905-910.
Dillahunt, et al., "The promise of the sharing economy among disadvantaged communities", In Proceedings of the 33rd Annual ACM Conference on Human Factors in Computing Systems, Apr. 18, 2015, pp. 2285-2294.
Disalvo, et al., "Mapping the landscape of sustainable HCI", In Proceedings of the SIGCHI Conference on Human Factors in Computing Systems, Apr. 10, 2010, pp. 1975-1984.
Dumais, et al., "Understanding user behavior through log data and analysis", In Journal of Ways of Knowing in HCI, Mar. 20, 2014, 26 Pages.
Ellison, et al., "The Benefits of Facebook "Friends:" Social Capital and College Students' Use of Online Social Network Sites", In Journal of Computer-Mediated Communication, vol. 12, Issue 4, Aug. 23, 2007, pp. 1143-1168.
Ettredge, et al., "Using web-based search data to predict macroeconomic statistics", In Journal of Communications of the ACM, vol. 48, Issue 11, Nov. 2005, pp. 87-92.
Ferrie, et al., "Health effects of anticipation of job change and non-employment: longitudinal data from the Whitehall II study", In British Medical Journal, vol. 311, No. 7015, Nov. 11, 1995, pp. 1264-1269.
Fourney, et al., "Exploring time-dependent concerns about pregnancy and childbirth from search logs", In Proceedings of the 33rd Annual ACM Conference on Human Factors in Computing Systems, Apr. 18, 2015, pp. 737-746.
Gee, et al., "Social Networks and labor markets: How strong ties relate to job finding on Facebook's social network", In Journal of Labor Economics, vol. 35, Issue 2, Apr. 2017, pp. 1-44.

(56) References Cited

OTHER PUBLICATIONS

Gilbert, et al., "Widespread Worry and the Stock Market", In Proceedings of Fourth International AAAI Conference on Weblogs and Social Media, May 23, 2010, pp. 58-65.

Ginsberg, et al., "Detecting influenza epidemics using search engine query data", In Journal of Nature, vol. 457, Feb. 19, 2009, pp. 1-5.

Goel, et al., "Predicting consumer behavior with Web search", In Proceedings of the National academy of sciences, vol. 107, Issue 41, Oct. 12, 2010, pp. 17486-17490.

Granovetter, Mark, "Getting a Job: A Study of Contacts and Careers", In Publication of University of Chicago Press, Mar. 15, 1995.

Granovetter, Mark S., "The strength of weak ties", In American Journal of Sociology, vol. 78, No. 6, May 1973, pp. 1360-1380.

Green, et al., "Inequalities in use of the Internet for job search: similarities and contrasts by economic status in Great Britain", In Environment and Planning A, vol. 44, No. 10, Jan. 1, 2012.

Griffeth, et al., "A meta-analysis of antecedents and correlates of employee turnover: Update, moderator tests, and research implications for the next millennium", In Journal of Management, vol. 26, Issue 3, May 2000, pp. 463-488.

Guillory, et al., "The effect of Linkedin on deception in resumes", In Journal of Cyberpsychology, Behavior, and Social Networking, vol. 15, No. 3, Feb. 2012, pp. 135-140.

Hargittai, et al., "New strategies for employment? internet skills and online privacy practices during people's job search", In Journal of IEEE Security & Privacy, vol. 11, Issue 3, May 2013, pp. 38-45.

Hooft, et al., "Predictors of job search behavior among employed and unemployed people", In Journal of Personnel Psychology, vol. 57, Issue 1, Mar. 2004, pp. 25-59.

Jahedi, et al., "Searching for information online", Retrieved from: http://www.dtic.mil/dtic/tr/fulltext/u2/1005137.pdf, Retrieved on: Apr. 20, 2018, pp. 1-23.

Jansen, et al., "Using the web to look for work Implications for online job seeking and recruiting", In Internet Research, vol. 15, Issue 1, Feb. 1, 2005, pp. 49-66.

Jen, et al., "Analyzing employment technologies for economically distressed individuals", In Proceedings of Extended Abstracts on Human Factors in Computing Systems, Apr. 26, 2014, pp. 1945-1950.

Kan, Michael, "Laid-off IT workers worry US is losing tech jobs to outsourcing", Retreived from: https://www.pcworld.com/article/3175682/techology-business/laid-off-it-workers-worry-US-is-losing-tech-jobs-to-outsourcing.html, Feb. 28, 2017, 8 Pages.

\* cited by examiner

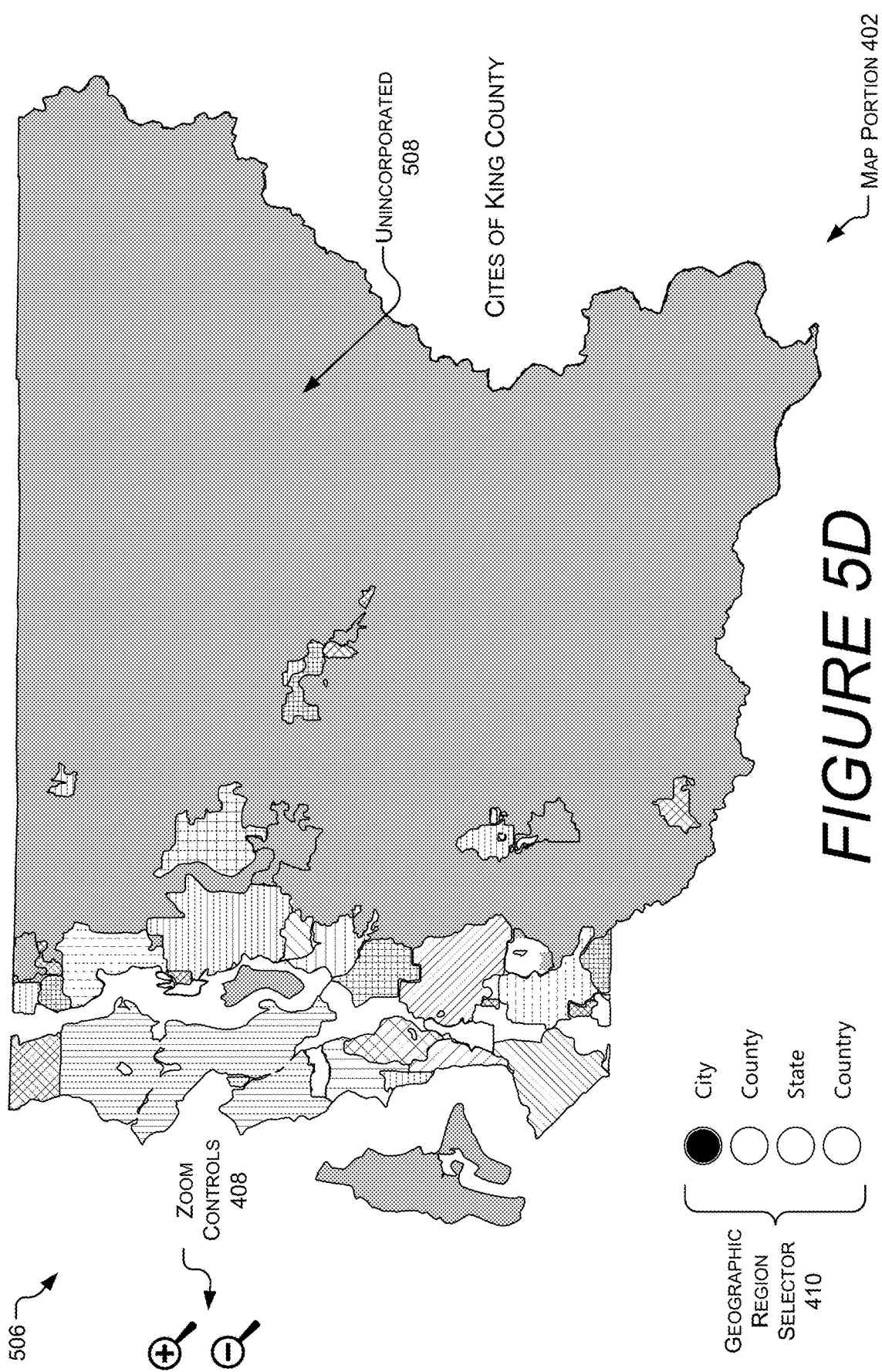

USER INTERFACE FOR VISUALIZING SEARCH DATA

CROSS-REFERENCE TO RELATED APPLICATION

This application claims the benefit under 35 U.S.C. § 119 of U.S. Provisional Patent Application Ser. No. 62/660,887, filed on Apr. 20, 2018 the disclosure of which is hereby incorporated by reference in its entirety.

BACKGROUND

Internet searches are a common way for people to research everything from jobs to vacations. For example, about 80% of job seekers use Internet search engines to find new employment. Many people are also more honest and forthright with Internet search engines than with other human beings. The aggregate data provided by search queries, either Internet search queries or other types of search queries, can provide meaningful insight into behavioral trends of groups of individuals. However, the large volume of data and the lack of externally imposed structure (i.e., people formulate search queries in many different ways) creates a set of "big data" that is difficult to analyze and interpret.

It is with respect to these and other considerations the disclosure made herein is presented.

SUMMARY

The techniques disclosed herein relate to categorization of search queries and visualization of search queries. Raw search queries include the query contents which is usually a string of text such as: "software developer jobs in Bellevue Wash." A search query may also include metadata such as the timestamp indicating when the search query was received by a search service and may also include a geolocation indicating the location of the computing device that generated the search query. Many popular commercial Internet search engines process billions of queries every day. This creates a very large set of raw search queries.

The large number of raw search queries may be initially reduced by first-pass filtering based on keywords. For example, if subsequent analysis will be performed on job search trends then keywords such as "job," "jobs," "career," and "careers" can be used. Different keyword would, of course, be used to analyze different topics. Raw search queries that do not include one of the keywords can be excluded greatly reducing the total number of search queries for further analysis.

Many search queries contain only a few words and it may be difficult to identify similar queries based on only the words included in the query contents. For example, "software developer jobs in Bellevue Wash." and "computer programming employment near Seattle" represent similar intents on the part of the searchers but do not include any of the same words. A technique such as word embedding may be used to create a numeric representation of the words in the query contents in a way that reflects semantic and syntactic similarities between the actual words in the query contents and other words with similar meanings. This allows identification of similarity between search query contents that do not use the same words.

The query contents may also be filtered by removing stop words and the keywords. Stop words are words that are commonly used and may be short function words such as the, is, in, at, which, and on. The keywords are the words are used for the first-pass filtering. Using the example raw search query of "software developer jobs in Bellevue Wash.," after removal of stop words and the keywords this results in "software developer Bellevue Wash."

The numeric representations of the query contents created by the word embeddings are separated into multiple different groups by a machine learning classifier. The multiple groups may be predetermined such as by a list of relevant categories. For example, analysis of job search queries may use categories that represent different classes of jobs such as business, construction, healthcare, manufacturing, etc. The machine learning classifier may be trained on labeled data—search query contents manually labeled with a category. Alternatively, the machine learning classifier may perform clustering which is grouping the raw search queries based on similarities to each other without using predefined categories. Following classification, the raw search queries are separated into multiple different groups. For example, the search query for "software developer jobs in Bellevue Wash." may be placed in a group labeled Technology.

The metadata associated with the raw search queries may be used to create visualizations based on geographic region and/or time. For example, all the raw search queries that originated from the same geographic region such as the same city, county, state, etc. may be grouped together. Within that geographic region, the number of search queries in each of the categories may be determined. Thus, for example, in King County, Wash., the number of search queries for employment related to Technology can be compared to the number of search queries for jobs in healthcare.

The relative number or frequency of raw search queries in a particular category may be visualized on a user interface (UI) such as a UI that includes a map showing various geographic regions. The UI may be changed to show the relative frequency of search queries in any of the available categories. For example, one view may show the relative number of job search queries for technology jobs across the counties of Washington state while another view shows the relative number of job search queries for healthcare jobs across the counties of Washington state.

Additionally, the UI may be modified based on a particular time slice of search query data. Internet search queries are collected continuously by search services. The dataset used to generate a given UI may be updated in substantially real time and incorporate the most recent raw search queries. Using the timestamp on the raw search queries, various datasets based on time may be selected such as searches from 2018 or searches during the first calendar quarter of 2019. The UI may be modified based on time while also been modified based on the category of search query displayed.

Further modifications to the UI can include filtering based on a characteristic of the geographic regions. The criteria in which a filter may be based can include social-economic dimensions of the geographic region such as population, education level, poverty rate, and the like. Filtering based on a criterion associated with the geographic regions may be implement it by changing the UI to emphasize or deemphasize the data in geographic regions based on the value of that criterion. For example, analysis of job search data may be filtered based on poverty rate and the UI may be modified to show the frequency of various job search categories of the geographic regions with the highest poverty rate, geographic regions with the lowest poverty rate, both, or in another way. Modified a UI based on the criterion of a filter does not necessarily change the underlying data, but changes which subsets of the data is emphasized visually (or otherwise) in the UI.

The UI, in some implementations, may also include a text portion that can control a portion of the UI displaying a map or other geographic data. Links or specific words in the text portion of the UI may cause a change in a map portion of the UI. The change may be based on the meaning of the text or link. For example, if the name of a state such as Washington is selected in the text, this may cause a map portion of the UI to change an area of focus or zoom level to show the state of Washington. As a further example, if the words "manufacturing jobs" are implemented as a clickable link in the text, then activating that link may cause a map portion of the UI to display the relative numbers of raw search queries for manufacturing jobs instead of a previously-displayed different category.

This Summary is provided to introduce a selection of concepts in a simplified form that are further described below in the Detailed Description. This Summary is not intended to identify key features or essential features of the claimed subject matter nor is it intended to be used to limit the scope of the claimed subject matter. Furthermore, the claimed subject matter is not limited to implementations that solve any or all disadvantages noted in any part of this disclosure. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 5D shows an illustrative map interface representing search data displayed based on frequency of search categories across multiple geographic locations at a fourth resolution.

DETAILED DESCRIPTION

Figure 1:
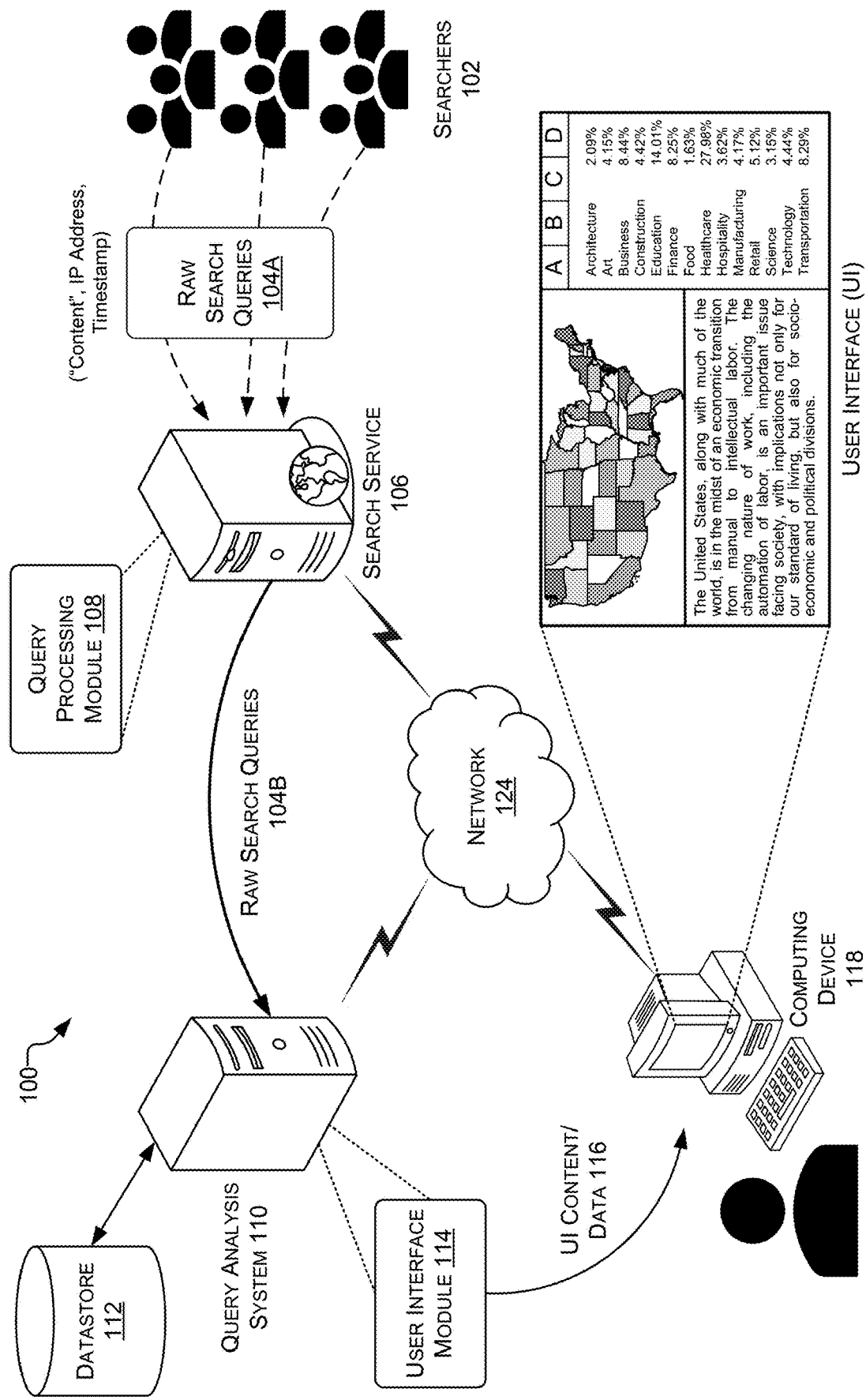
FIG. 1 illustrates an illustrative architecture for visualizing search data.

This disclosure describes techniques for processing and visualizing search data. Raw search data may be collected and anonymized by search services such as Alphabet's GOOGLE, Microsoft's BING, or YAHOO. However, raw search data is very difficult to understand and interpret for human users. Even if the raw search data is given basic formatting such as being displayed in a table or as comma separated values (CSV), the volume of data and the variety of different searches people perform would make for a table of data that is difficult or impossible for a human to interpret.

There is, however, a large amount of useful information contained in Internet search queries. Consider research into the question of employment demand which is the measure of job seeking by prospective employees, both in the number of people looking for work and in the types of work they seek. The types of jobs people are searching for on the Internet likely provides useful information regarding employment demand. Yet a vast number of raw search queries, without more, does not provide any human-usable information. This represents a significant problem in the field of human-computer interactions (HCI) specifically the field of information visualization.

By applying the techniques presented in this disclosure, a large set of data or "big data" obtained from raw search queries can be modified and presented in ways that make the data usable for the human interacting with a computing device. Data visualization is a term that describes any effort to help people understand the significance of data by placing it in a visual context. Patterns, trends, and correlations that might go undetected if presented differently may be detected when appropriate visualization techniques are applied. Thus, data is effectively transformed by creating new data, through visualizations, that these patterns, trends, and correlations.

Using computing devices to apply data processing and data visualization techniques to raw search data improves the usability of the data and enables human-data interactions that were not previously possible. Additionally, both the classification and the visualization techniques in this disclosure make use of the unique characteristics of search queries such as Internet search queries. For example, text strings generated from search queries are generally much shorter than other types of text that may be analyzed or classified such as paragraphs of text, pages of text, or entire books. Thus, the classification techniques disclosed here include technical features specific to processing shorter strings of text.

Furthermore, the type of metadata that commonly accompanies search queries is different from types of metadata available with other data. Search queries, particularly Internet search queries, generally have an Internet protocol (IP) address or other indicator of the computing device sending the query. This can be used to identify the geolocation of the computing device. Search services may also be tagged with timestamps that indicate a date and time. Other types of big data may not be associated with geolocation and/or timestamps. Thus, the visualizations and UI designs described in this disclosure make use of the technical features of search queries such as geolocation and timestamps.

FIG. 1 shows an illustrative architecture 100 for analyzing and visualizing search queries. A plurality of searchers 102 generates raw search queries 104. The searchers 102 represents both the human users and the respective computing devices that each interacts with to generate a raw search query 104. The raw search queries 104A as they leave the searchers 102 contain query content.

The search content is the text of the search as entered by the searchers 102. In implementations in which the searchers 102 interact with their respective devices through voice, the search content may be converted to a text string by an appropriate technique such as speech recognition. Conversion of non-text input into text may be performed by the searchers 102 or by another computing device in the architecture 100.

The raw search queries 104A may also contain metadata such as a device identifier and/or a timestamp. A device identifier may be an IP address, a media access control (MAC) address, serial number or other unique identifier. Other types of metadata may also be associated with the raw search queries 104A such as the language setting of a computing device, a web browser or other software user enter the search query, an operating system installed on the computing device, etc.

The raw search queries 104A are received by search service 106. In an implementation, the search service 106 may be an Internet search engine such as GOOGLE or BING. But the techniques of the disclosure work equally well with other types of search services 106 besides Internet search engines.

The search service 106 may include a query processing module 108 that processes the raw search queries 104A received from the searchers 102. The query processing module 108 may append or modify metadata associated with the raw search queries 104A. Thus, in some implementations, the raw search queries 104A received by the search service 106 may have different metadata than the raw search queries 104B provided by the search service 106 to other systems. For example, the query processing module 108 may attach its own timestamp to the raw search queries 104A indicating when they were received by the search service 106.

The query processing module 108 may also map the device identifier such as an IP address into a geolocation such as a latitude and a longitude. IP-based geolocation is mapping of an IP address or MAC address to the real-world geographic location of an Internet-connected computing or a mobile device. Geolocation may include mapping IP address to the country, region (city), latitude/longitude, Internet service provider (ISP), and domain name among other useful things. Thus, the query processing module 108 may replace one type of metadata (e.g., an IP address) with a different type of metadata (e.g., a geolocation).

The query processing module 108, or another module in the search service 106, may also identify search results in response to the raw search queries 104(A) and return the results to the searchers 102.

The raw search queries 104(B) may be provided from the search service 106 to a query analysis system 110. The query analysis system 110 may be implemented as part of the search service 106 including on a separate physical device in the same server farm/cluster or under the control of the same entity as the search service 106. Alternatively, the query analysis system 110 may be implemented on separate computing devices at separate location and under the control of a different entity than the search service 106.

The query analysis system 110 includes functionality that may be implemented as modules or other computing components for processing the raw search queries 104 and classifying the raw search queries 104 into separate categories. The query analysis system 110 may also access additional data from one or more datastores 112 to correlate with the raw search queries 104. For example, analysis of employment demand in the United States may draw data from additional sources such as the Bureau of Labor Statistics and the U.S. Census Bureau. Data from these additional sources may be stored in and obtained from the one or more datastores 112.

A user interface module 114 may also be part of the query analysis system 110. The user interface module may generate data for creating a UI to illustrate the analysis of the raw search queries 104. The user interface module 114 may create UI content or data 116 that is sent to a computing device 118 for display to a user 120. In an implementation, the user interface module 114 may send data representing the analysis of the raw search queries 104 which is then used by systems on the computing device 118 to generate a UI. In another implementation, the user interface module 114 may send full UI content such as a bitmap image that is displayed on the computing device 118 with minimal additional processing. Thus, the specific operations to generate a UI that is viewed by the user 120 may be split, to various degrees, between the computing device 118 and the user interface module 114.

Moreover, in an implementation, some or all of the functionality of the query analysis system 110 may be located on the computing device 118 rather than in a remote server or cloud computing configuration.

A UI 122 is rendered on the computing device 118. The UI 122 may include maps, graphics, charts, text, statistics, actionable UI elements, and other features.

All of the computing devices in architecture 100 including the search service 106, the query analysis system 110, and the computing device 118 may communicate with each other and other computing devices via a network 124. The network may be implemented as any type of communications network such as the Internet, a local area network, a wide area network, a peer-to-peer network, a web network, etc. using any type of physical hardware for transferring electronic data such as fiber optics, coaxial cables, ethernet cables, twisted pair copper cables, etc.

Figure 2:
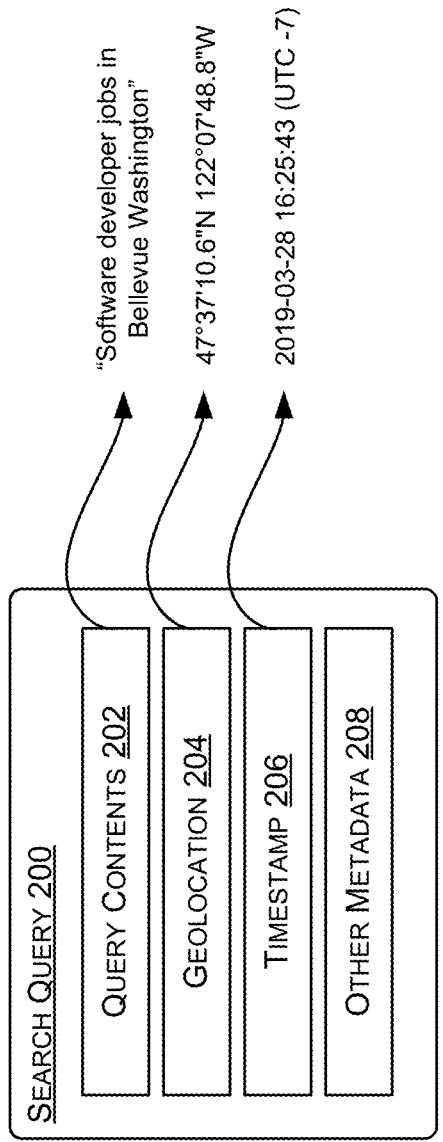
FIG. 2 shows an illustrative data structure for a search query.

FIG. 2 shows an example of a data structure for the raw search queries 104. The individual search query 200 may include query contents 202 which is the text of the query. The query contents 202 may be a short string of words such as: "Software developer jobs in Bellevue Wash." For example, the query contents 202 may be a string of between approximately two and 10 words.

A search query 200 may also include one or more types of metadata. One type of metadata is geolocation 204. Geolocation 204 represents a physical location indicating where the search query 200 originated from based on the computing device that sent the search query. One format for representing geolocation 204 is a geographic coordinate system such as latitude and longitude. Thus, geolocation 204 may be represented in terms of minutes, degrees, and seconds of latitude and of longitude.

A timestamp 206 may also be included in the search query 200. The timestamp 206 may represent the time when the search query 200 was sent from the computing device initiating the search query 200, when the search query 200 was received by a search service 106, or when the search service 106 sends an answer in response to the search query 200. The timestamp 206 may indicate a year, month, date, hour, minute, second, fractional second, and/or time zone. In some implementations, the timestamp 206 may be generalized such as by omitting some of the more precise data. For example, the timestamp 206 for a search query 200 may be simplified to year, month, and date by omitting the specific time of day. The timestamp 206 may also be normalized based on universal time (UTC), coordinated universal time (UTC), Greenwich Mean Time (GMT), or other standard time. By normalizing the times, search queries occurring at the same absolute time but at different clock times due to the time zones will be analyzed as occurring at the same time.

The search query 200 may also include any types of other metadata 208. The other metadata 208 may include information about the computing device that generated the search query 200 such as type of device (e.g., handheld, laptop, or desktop) available input devices (e.g., touchscreen), installed languages, operating systems, installed software, web browser used to generate an Internet search query, and the like.

Figure 3:
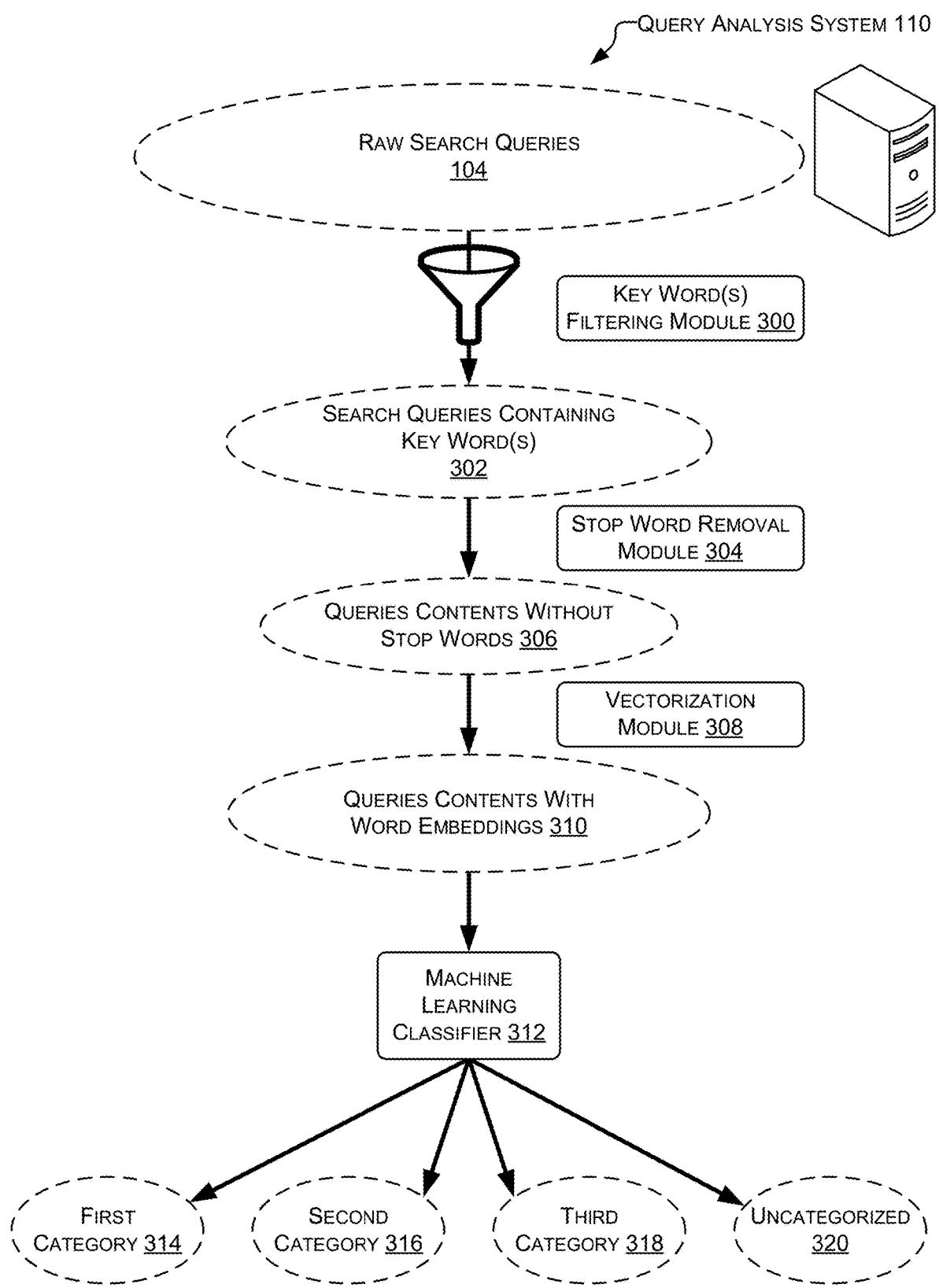
FIG. 3 shows illustrative modules and operations performed by a query analysis system.

FIG. 3 shows illustrative modules and operations that may be performed by the query analysis system 110. The query analysis system 110 may initially receive a large number of raw search queries 104 such as many billions of search queries 104. The raw search queries 104 may be anonymized and aggregated from the activities of many searchers 102. The raw search queries 104 may include unfiltered search queries related to a wide range of topics.

A keyword(s) filtering module 300 in the query analysis system 110 may make an initial pass to filter out raw search queries 104 that do not contain keywords related to the topic of analysis. Filtering on keywords may limit the raw search queries 104 to only those search queries that are directed to a specified intent represented by the keywords (e.g., job search). For analysis of employment demand, keywords used to identify raw search queries 104 that are directed to job searching may include "job," "jobs," "employment," "career," and "careers." The specific set of keywords may be manually selected and tuned to minimize false positives. The raw search queries 104 that contain one or more of the keywords may nevertheless be filtered out if those queries also have a co-occurring salacious word, a URL or URI, or a common keyword associated with a false positive (e.g., "Steve" and "nose" as words that commonly occurs with the keyword "jobs" in queries that are not related to job searching).

Following this initial filtering, there is a much smaller set of the search queries containing one or more of the keyword(s) 302. The words in the search queries, the query contents 202, may be filtered to remove stop words and keywords by a stop word removal module 304. Any list of stop words may be used. Generally, stop words are short function words that do not assist with classification of the search queries. Removal of the keywords by the stop word removal module 304 removes words which are present in all the search queries at this stage, and thus, do not serve to further differentiate one search query from another.

The filtering performed by the stop word removal module 304 results in query contents without stop words 306. These are the same search queries that were present at 302, but the number of words in the query contents 202 of each has been reduced.

A vectorization module 308 creates vectors from the text of the search queries at 306. This is called feature extraction or feature encoding and the vectors reflect various linguistic properties of the text. The multi-dimensional feature vector may include, for example, 100-1000 dimensions, 200-500 dimensions, or approximately 300 dimensions. There are many techniques for creating vector representations of textual data.

One such technique is word embeddings. Based on neural networks, word embeddings quantify contextual similarities between words using vector representations of these relationships. Word embedding is a set of language modeling and feature learning techniques in natural language processing (NLP) where words or phrases from the vocabulary are mapped to vectors of real numbers. Conceptually it involves a mathematical embedding from a space with one dimension per word to a continuous vector space with a much lower dimension. Word embeddings are used to expand model feature space to understand language use by inferring contextual similarity between words similar to but not identical to keywords, thereby expanding a keyword set. The vectorization module 308 may look up a word embedding for each word remaining in the search queries at 306 and then average it using the coordinate-wise mean to produce a composite multi-dimensional feature vector.

One illustrative word embedding technique that may be used is the word2vec algorithm described in U.S. Pat. No. 9,037,464. Word2vec uses shallow, two-layer neural networks that are trained to reconstruct linguistic contexts of words. Word2vec takes as its input a large corpus of text and produces a vector space, typically of several hundred dimensions, with each unique word in the corpus being assigned a corresponding vector in the space. Word vectors are positioned in the vector space such that words that share common contexts in the corpus are located in close proximity to one another in the space.

Other word embedding techniques and algorithms may also be used. For example, a single rather than a two-layer neural network may be used to generate word embeddings. The single-layer neural network identifies the presence or absence of a word. The input for all words that are not found in the search query is no and yes for the few words that are present in the search query at 306 following removal of stop words. Moreover, the input corpus for training the word embedding neural network may be based on search queries that are similar to the raw search queries 104 that will be analyzed by the vectorization module 308. For example, if the raw search queries 104 are queries directed to an Internet search engine, then other Internet search engine queries may be used to train the neural network used for word embeddings.

The query contents with word embedding 310 as generated by the vectorization module 308 may be passed to a machine learning classifier 312 for classification into one of a number of predetermined categories. The categories into which the machine learning classifier 312 sorts the queries (with their respective word embeddings) may be based on or related to the intent of the searches that are identified by the keywords. For example, if the intent that is captured by the keywords is "job search" then the categories may be job categories. The categories may be predetermined, that is, the categories may be set prior to any analysis of the raw search queries 104. For example, job categories may include architecture, art, business, construction, education, finance, food, healthcare, hospitality, manufacturing, retail, science, technology, and transportation.

In an implementation, the machine learning classifier 312 may perform clustering and groups the search queries into categories that are not predetermined but are based on similarities between the search queries themselves. In the terminology of machine learning, classification is considered an instance of supervised learning (i.e., learning where a training set of correctly identified observations is available). The corresponding unsupervised procedure is clustering and involves grouping data into categories based on some measure of inherent similarity or distance.

Any suitable type of machine learning classifier 312 may be used such as Naïve Bayes, logistic regression, decision trees including random forests, artificial neural networks, or support vector machines (SVM). A SVM model is a representation of the examples as points in space, mapped so that the examples of the separate categories are divided by a clear gap that is as wide as possible. New examples are then mapped into that same space and predicted to belong to a category based on which side of the gap they fall. In addition to performing linear classification, SVMs can efficiently perform a non-linear classification using what is called the kernel trick, implicitly mapping their inputs into high-dimensional feature spaces. In machine learning, the radial basis function kernel, or RBF kernel, is one kernel function used in various kernelized learning algorithms such as SVM.

In one illustrative implementation, the machine learning classifier 312 may use a one-versus-all multi-class SVM classification trained using 10-fold cross-validation with an RBF kernel set to gamma=0.01 and C=1000. Different parameters may be selected using parameter sweeping and the best parameters may vary given the data set to be analyzed. The gamma parameter is a kernel hyperparameter that defines how far the influence of a single training example reaches, with low values meaning 'far' and high values meaning 'close'. The gamma parameter is the inverse of the radius of influence of samples selected by the model as support vectors. The regularization constant, or C parameter, trades off correct classification of training examples against maximization of the decision function's margin. For larger values of C, a smaller margin will be accepted if the decision function is better at classifying all training points correctly. A lower C will encourage a larger margin, therefore a simpler decision function, at the cost of training accuracy. Thus, "C" behaves as a regularization parameter in the SVM. One source for implementing SVM classifiers is the scikit-learn machine learning library for the Python programming language.

The machine learning classifier 312 may separate the queries into, for example, a first category 314, a second category 316, and a third category 318. Of course a greater, or fewer, number of categories may be used. There may also be an uncategorized category 320 which receives all the search queries are not placed into one of the other categories. Continuing with the example of job search queries, the uncategorized category 320 may represent those search queries that are generic job queries not associated, based on the words included in the query content 202, with one of the predefined categories such as architecture, business, or healthcare.

FIGS. 4A-F show various views of an illustrative user interface (UI) 400. The UI 400 may be the same or similar to the UI 122 introduced in FIG. 1. The UI 400 may be presented inside the window of a web browser or through a different application such as a dedicated data analysis application like a database application or business intelligence application. The UI 400 is illustrated and described herein as a graphical user interface (GUI) but may also be adapted and implemented in whole or part using other output technologies such as sound, haptics, and the like.

Figure 4A:
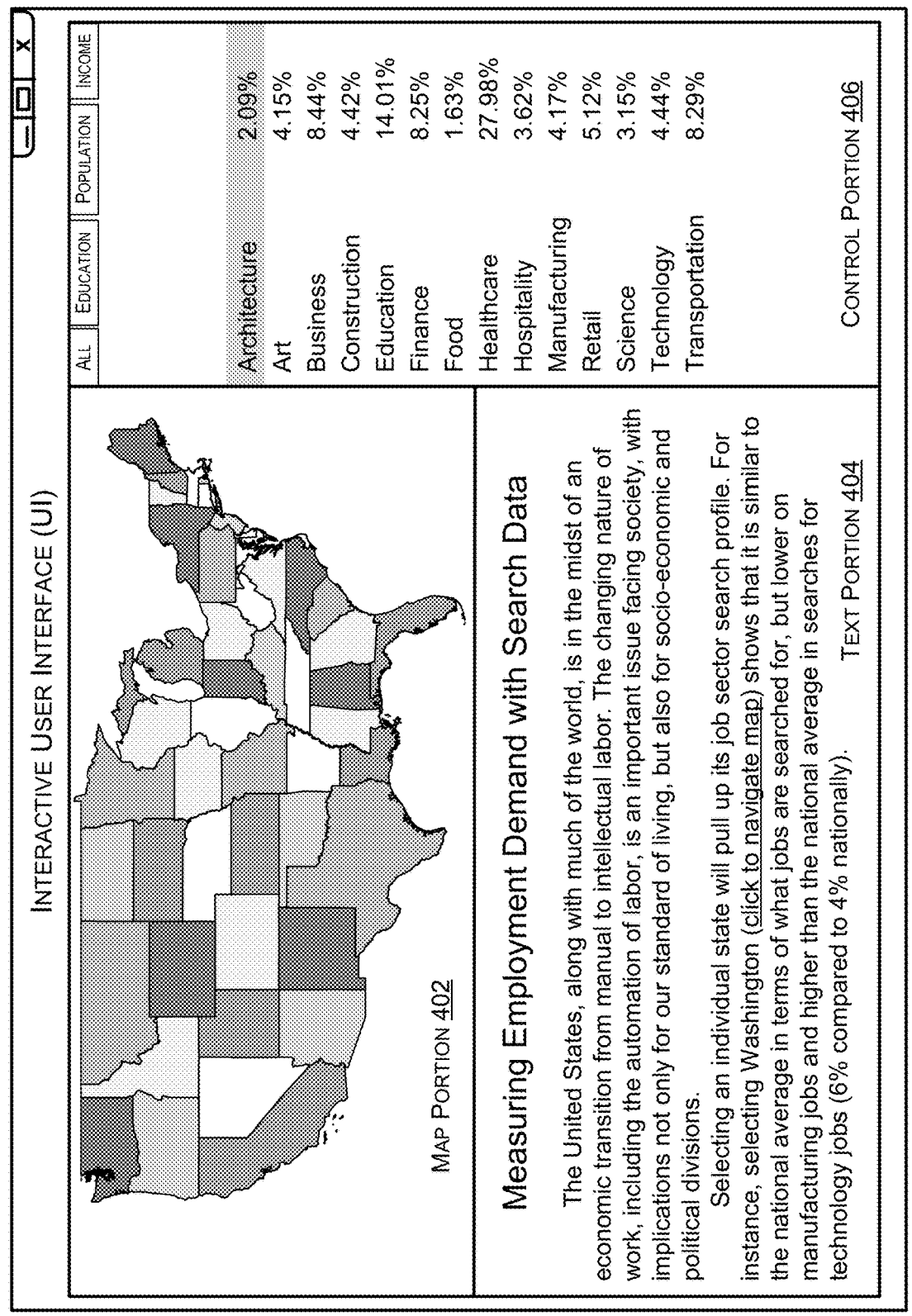
FIG. 4A shows an illustrative UI including a map portion, a text portion, and a control portion.

FIG. 4A shows a first view 400A of the UI 400. In this view 400A, the UI 400 includes a map portion 402, a text portion 404, and a control portion 406. Although shown as clearly delineated in separate portions, in some implementations the separate portions of the UI 400 may overlap or be mixed with each other. Moreover, the relative positioning and size of the respective portions are not limiting, and a display or other UI output element may be configured in any suitable way to present one or more of the map portion 402, the text portion 404, and the control portion 406. The map portion 402 provides a map view of geographic regions. The geographic regions may be based on political boundaries such as the states of the United States of America. However, the geographic regions may be delineated in any number of ways such as by postal codes, by overlaying a grid onto the map area to be analyzed, or other technique.

The text portion 404 includes text that is conceptually related to the data displayed in the map portion 402. The text in the text portion 404 may be formatted using a markup language such as hypertext markup language (HTML) or extensible markup language (XML) and may include interactive elements such as links.

The control portion 406 includes selectable elements for changing the content displayed in the map portion 402. The control portion 406 may also contain information related to the analysis of the search queries. For example, the control portion 406 may display the percentage of categorized search queries (i.e., queries that were classified into one of the categories other than the uncategorized category 320). In this example, the control portion 406 shows that 2.09% of the categorized search queries were for architecture jobs. Thus, the control portion 406 is not limited to containing only controls. In this view 400A, the control portion 406 displays the categories into which the raw search queries were classified. This example includes 14 different categories of jobs. The gray highlighting of the job category "architecture" indicates that this was selected and the map portion 402 displays the results of search queries for jobs related to architecture.

The map portion 402 may show the respective geographic regions, in this example U.S. states, with different visual characteristics that correspond to the frequency of search queries related to architecture jobs. Visual characteristics may include color, shading, brightness, patterns, textures, apparent height in a 3D representation, or any other technique for representing a numerical value associated with a geographic region in a UI. The numerical value may be continuous such as any value between zero and 100. Alternatively, underlying numerical values may be grouped into ranges or bins and the UI may indicate the bin to which a specific numerical value belongs. For example, values between 0 and 10 may be associated with a first bin that represented graphically by the color white, values between 100 and 100 may be associated with a tenth bin represented graphically by the color black, and values between 11 and 89 may be represented by eight different shades of gray ranging from light gray for values between 11 and 20 to dark gray for values between 80 and 89.

This view 400A shows the percent of queries in the category relative to other categories and relative to the average for the displayed geographic regions (i.e., if showing states for the U.S. then darker shading correlates with a higher number of searches in the category of architecture based on how much higher or lower those searches are compared to the average across all U.S. states.) Thus, states shown in the map portion 402 with a darker gray shading have a higher percentage of the categorized job searches categorized as searches for architecture jobs than states shown with a lighter gray shading. This provides a visualization of the percent or ratio of search queries directed to a given category not the absolute number.

Figure 4B:
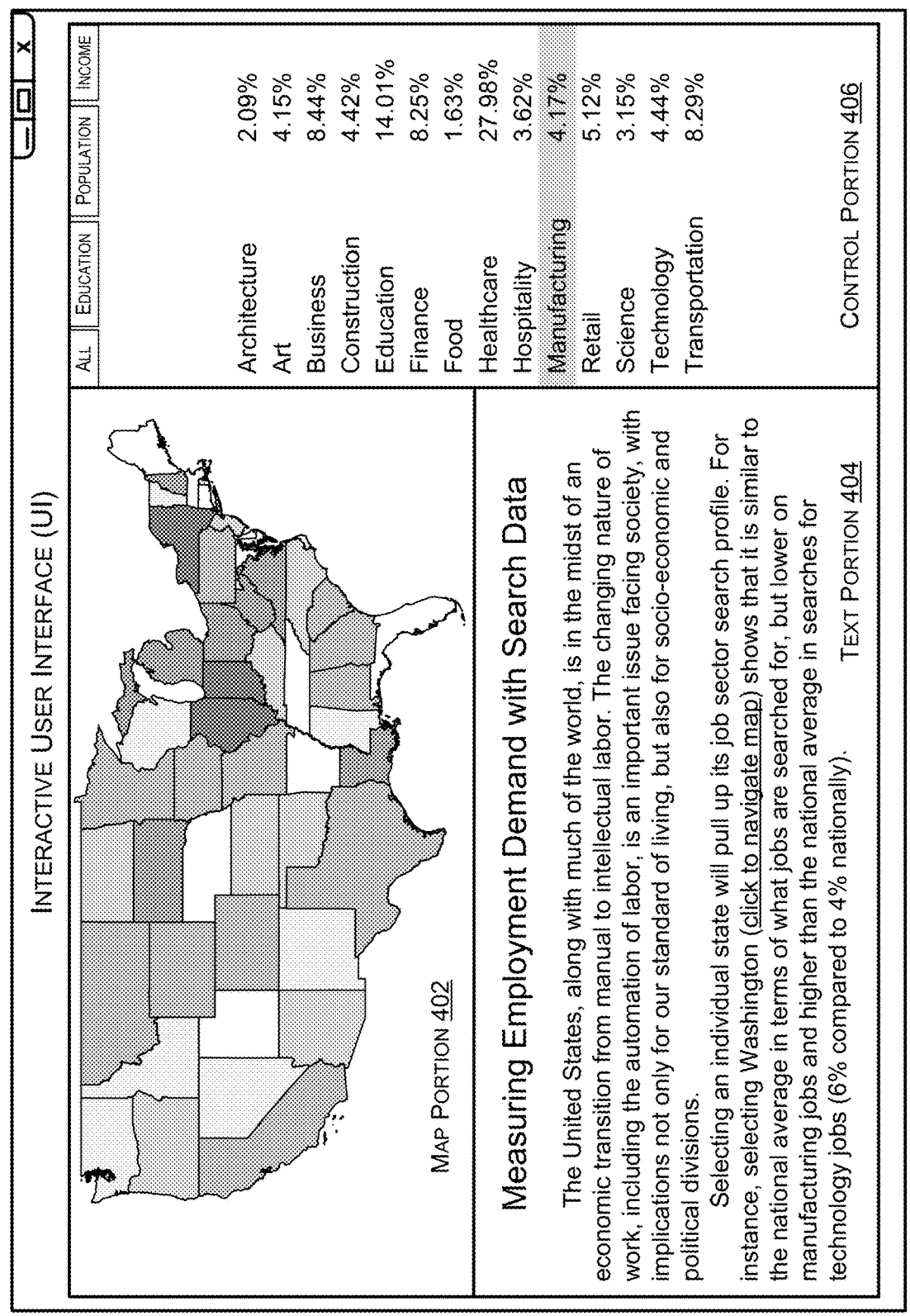
FIG. 4B shows the UI of FIG. 4A with a different category selected in the control portion resulting in a change to the display in the map portion of the UI.

FIG. 4B shows a second view 400B of the UI 400. In this view 400B, the job category of manufacturing is selected as indicated by the gray highlighting. The map portion 402 shows different data in response to the selection of a different category of the search query. Thus, the geographic regions, the U. S states, are shaded differently indicating a different distribution in the searches for manufacturing jobs relative to the distribution of searches for architecture jobs shown in FIG. 4A.

Figure 4C:
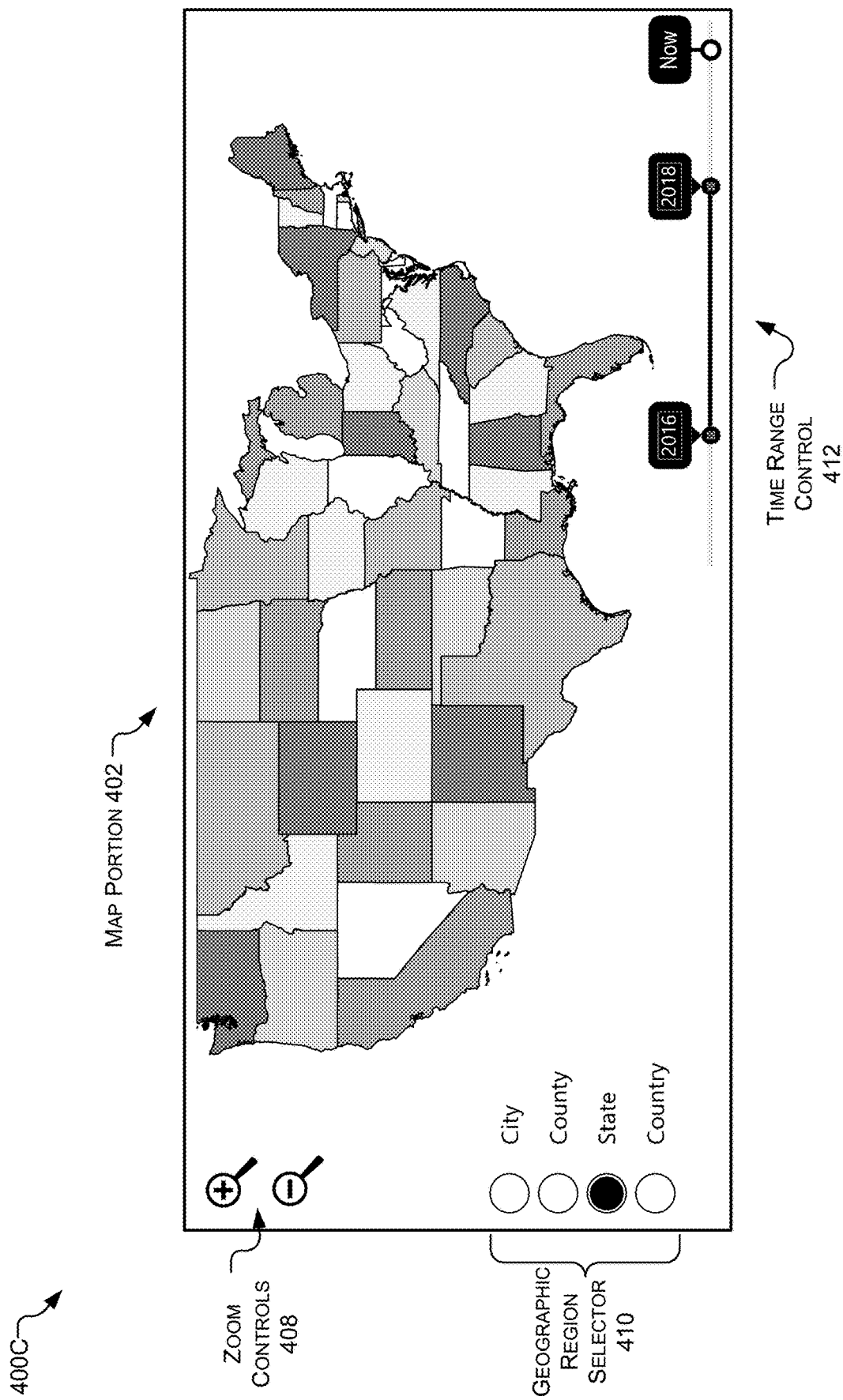
FIG. 4C shows enlargement of the map portion of the user interface from FIG. 4A with controls for adjusting the view.

FIG. 4C shows a view 400C of the UI 400 that includes an enlargement of the map portion 402. The map portion 402 may include one or more sets of controls for manipulating both the display and the data underlying the map shown in the UI. The zoom level of the map portion 402 may be adjusted by zoom controls 408 that increase or decrease the scale of the map. Changing the zoom level of the map portion 402 may also automatically change the units of the geographic regions used for displaying the search query data. For example, zooming in on a particular state may cause the map portion 402 to change so that it shows the relative search query frequency for the counties of that state.

There may also be a geographic region selector 410 that allows for the user 120 to select the units of the geographic regions used for grouping and visualizing the search query data. In this example, the choices provided by the geographic region selector 410 are country, state, county, and city. However, other types of geographic regions may also be used such as geographic regions such as various sized units that are squares with an area of 10,000 mi.$^2$, 5000 mi.$^2$, 1000 mi.$^2$, or 100 mi.$^2$. Changing the displayed geographic region with the geographic region selector 410 will change the units into which search queries are grouped but does not necessarily change the scale of the map.

The map portion 402 may also include a time range control 412 for selecting a time slice or set of search query data to visualize. The raw search queries 104 may be continuously collected in real-time by the search service 106 and later stored or archived along with the corresponding timestamp 206 metadata. Use of the timestamp 206 allows for the selection of various sets of raw search query data 104 to analyze and display. In this view 406C, the time range control 412 is used to select a two-year range of query data from 2016 to 2018. In response to the user 120 selecting a different time range, this view 400C may update by showing how, if at all, the frequency of search queries per category changed across the displayed geographic regions. The time range control 412 may be used to view historical search behavior and may also provide a basis for forecasting future changes in search patterns. Forecasting may be performed by observing or calculating trends in the changes of search behavior over time and inferring that the trends will continue in the same direction into the future. Thus, an increase in searches for "technology" jobs in a given region may indicate that the geographic area is on the way to becoming a technology hub.

The time range control 412 may also include a setting to select the most current raw search queries 104 (e.g., a "now" button) to provide a real-time or substantially real-time view of searching behavior. This timescale at which the search query data is presented upon selection of the "now" button may depend upon the timescales at which the raw search queries 104 are batched and provided to the query analysis system 110. For example, the "most recent" raw search queries 104 may include those queries from the last hour, the last six hours, the last 24 hours, the last three days, last week, or a different time range.

Figure 4D:
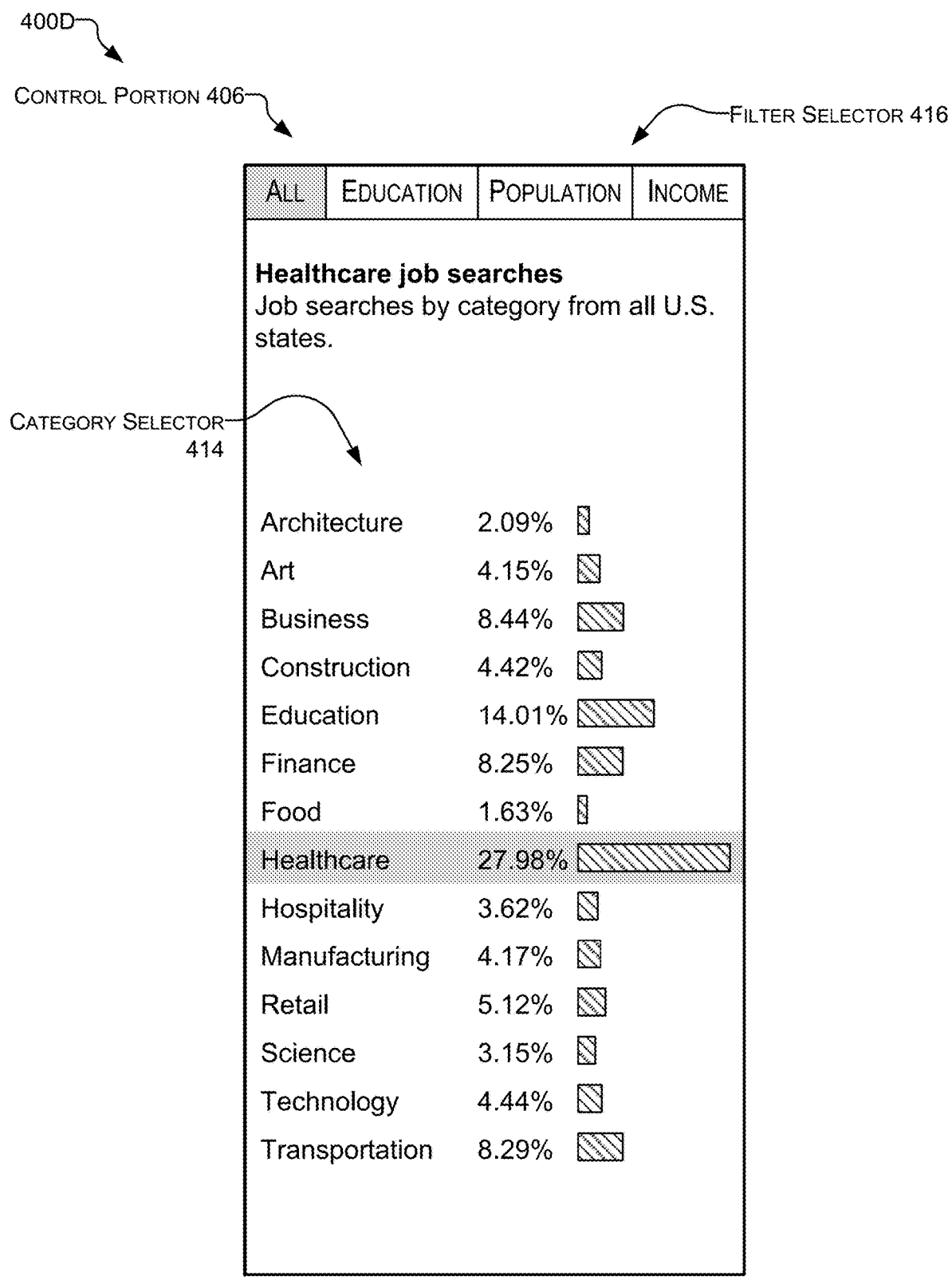
FIG. 4D shows enlargement of the control portion of the user interface from FIG. 4A.

FIG. 4D shows a view 400D of the UI 400 that includes an enlargement of the control portion 406. The control portion 406 may include a category selector 414 that is used to select which category of search queries are displayed in the map portion 402. In this example, the category of healthcare is selected as indicated by the gray highlighting. The control portion 406 may also display various statistics related to the categories such as the percent of total searches that are grouped into each of the respective categories. This may be displayed using text, a graph such as a bar graph, or other visualization.

The control portion 406 may also include a filter selector 416. The filter selector 416 applies a filter to the data that is displayed in the map portion 402. A selection of "all," "no filter," or the like may cause the map portion 402 display the analysis of the search queries without applying this filter. The filters apply a criterion associated with the geographic regions displayed in the map portion 402. For political division such as counties, states, etc. the filter may apply a socio-economic criterion. For example, the filter may modify the map portion of the UI 400 based on the education, population, income, age, or other socio-economic criterion of the geographic regions. The filters are of course not limited to socio-economic criterion and may include any other factors associated with the geographic regions such as environmental factors like average temperature, average rainfall, flood risk, or technical factors such as average Internet bandwidth, the prevalence of mobile devices, etc. The sources of the data on which to apply the filters may come from the datastore 112.

Figure 4E:
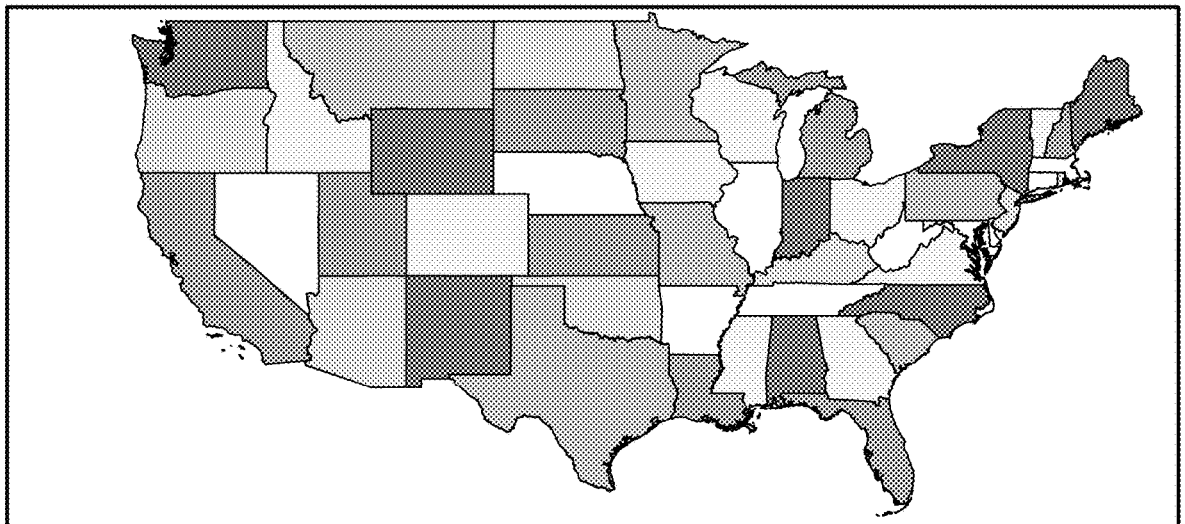
FIG. 4E shows the map portion and the text portion of the UI from FIG. 4A.

FIG. 4E shows a view 400E of the UI 400 that includes the map portion 402 and the text portion 404. The map portion 402 and the text portion 404 may be linked so that interaction with one controls the content displayed in the other. There may be a tight coupling between the text in the text portion 404 and the map in the map portion 402 so that the visual data context in the map portion 402 is relevant to the content or topic of the text displayed in the text portion 404. For example, selecting a link in the text related to a geographic region, a search query category, a filter, a time period, or other factor may cause the map portion 402 to change automatically in a way that emphasizes the selected text. In this view 400E, selection of the text link "click to navigate map" causes the map portion 402 to change so that it shows the state of Washington corresponding to the content of the text.

Figure 4F:
FIG. 4F shows a change to the map portion from FIG. 4E in response to interaction with the text portion of the UI.

FIG. 4F shows a view 400F following selection of the text link in FIG. 4E. The map portion 402 has changed to show the state of Washington. Interaction with the text in the text portion 404 is not limited to links per se but may also include selection of any text whether formatted as a link or not.

Furthermore, interactions with the map portion 402 may cause the text displayed in the text portion 404 to change. For example, selecting a particular geographic region in the map portion 402 may cause the text in the text portion 404 to scroll to a discussion of that geographic region. Thus, in this implementation, the UI 400 provides a tight coupling between textual content and visual content rendered in the text portion 404 and the map portion 402 respectively. This provides an easier and more intuitive interaction with the content without requiring a user to identify or interact with a specific UI element.

FIGS. 5A-5D show changes in the zoom level of the map portion 402 and the size of the geographic regions used for sorting and displaying the search query data. Each of these figures may be displayed within the map portion 402 of the UI 400.

Figure 5A:
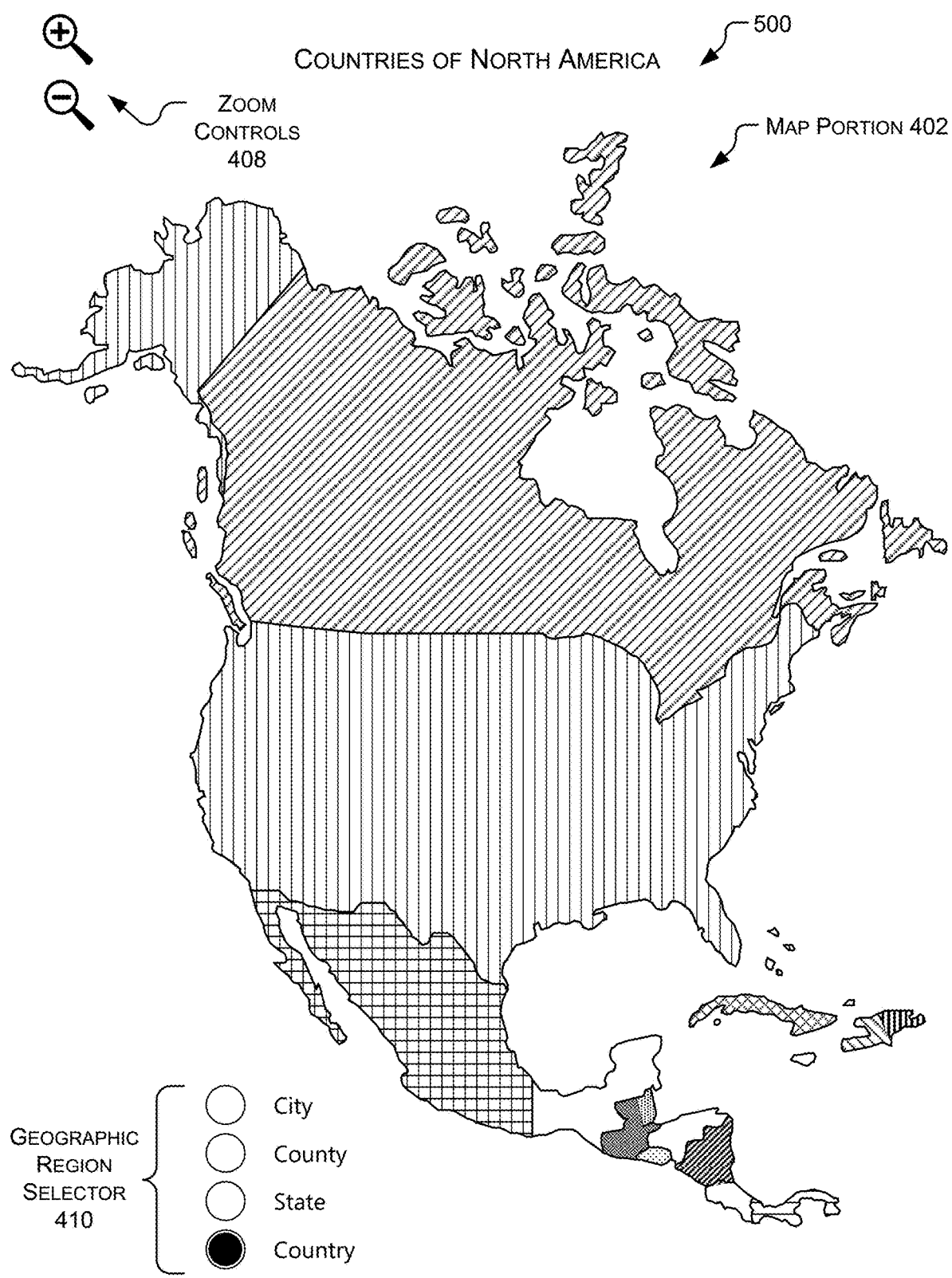
FIG. 5A shows an illustrative map interface representing search data displayed based on frequency of search categories across multiple geographic locations at a first resolution.

FIG. 5A shows a view 500 of the map portion 402 displaying countries of North America, the Caribbean, and Central America. In this view 500, the size of the geographic region is a country. The shading, coloring, or other visual indicators for the respective countries shows the frequency with which search queries in a particular category are performed by searchers 102 in those countries. Thus, for example, this view 500 may allow the user 120 to quickly identify which of Canada, United States, Mexico has a greater frequency of search queries related to business jobs. As discussed above, the zoom level of the map portion 402 and the scale of the geographic regions may be controlled by use of zoom controls 408 and or the geographic region selector 410.

Figure 5B:
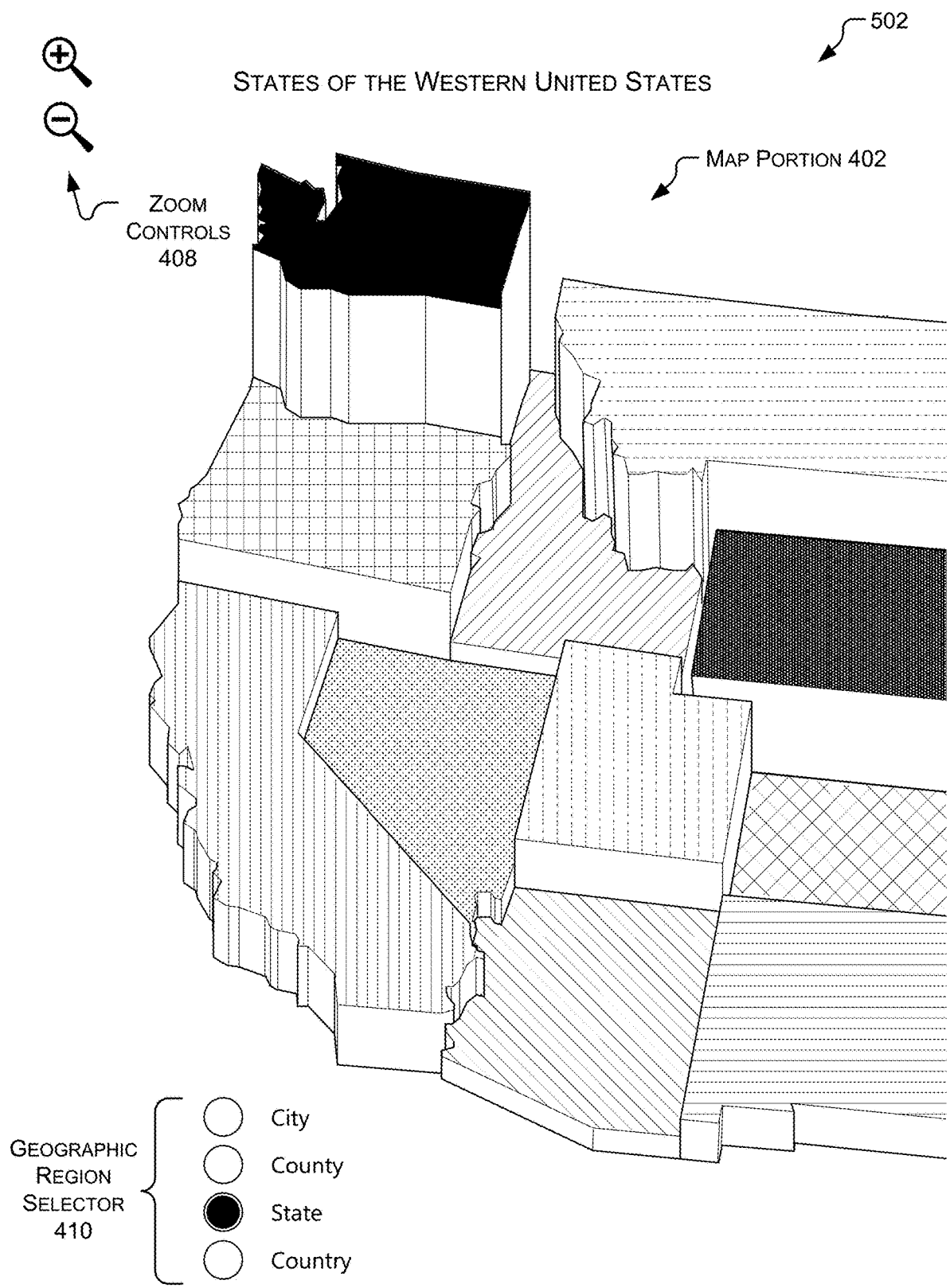
FIG. 5B shows an illustrative map interface representing search data displayed based on frequency of search categories across multiple geographic locations at a second resolution.

FIG. 5B shows a view 502 of the map portion 402 displaying states of the western U.S. In this view 502, the states are shaded, and each is shown with a 3D projection as having a different height representative of the frequency of search queries in a selected category. Thus, many types of visual modifications besides coloring, shading, textures, patterns may be used to indicate the relative frequency of search queries per geographic region. For the category selected to generate this view 502, Washington has a relatively higher percentage of search queries than any of the other states in the shown in this view 502.

Figure 5C:
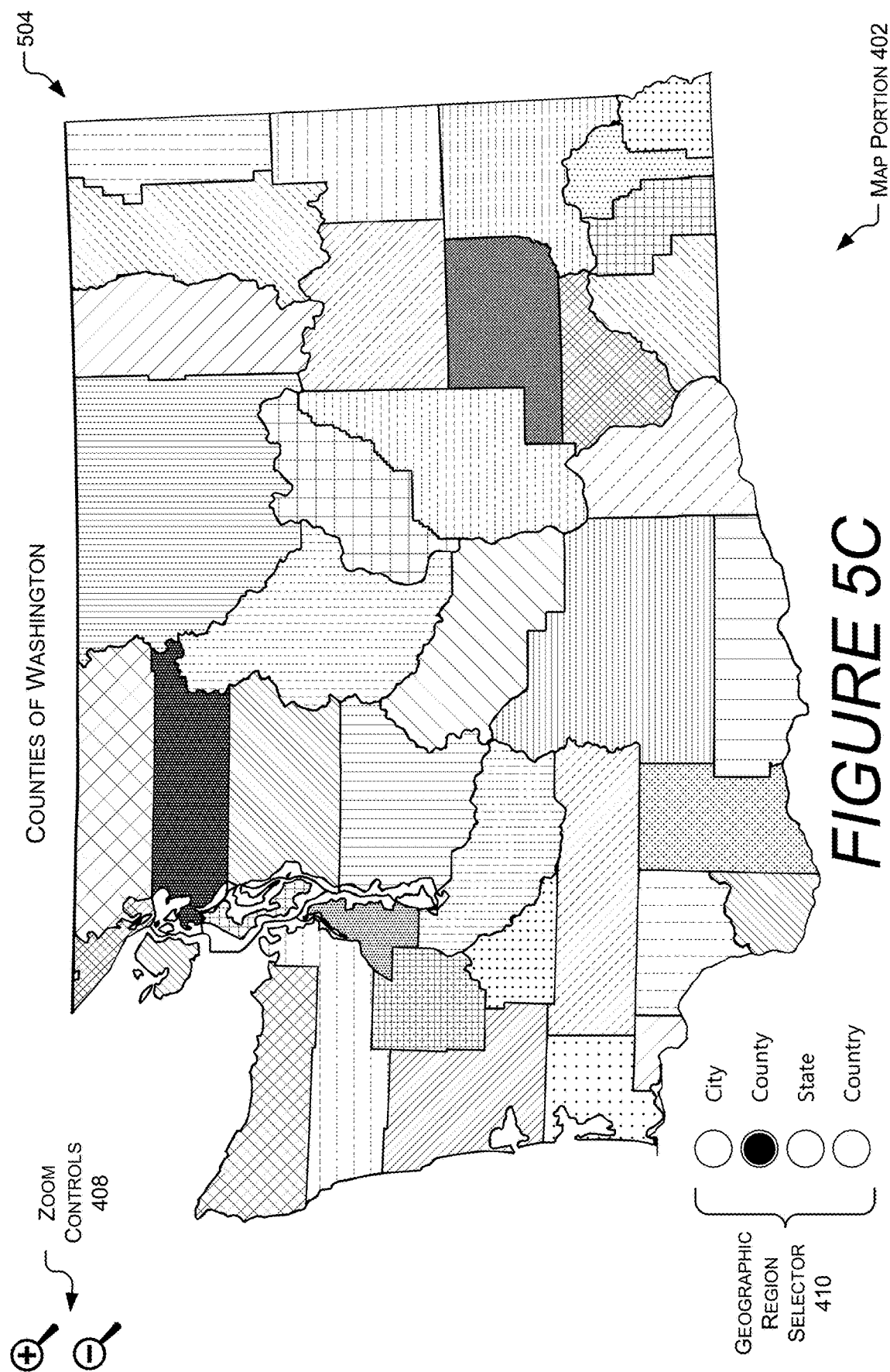
FIG. 5C shows an illustrative map interface representing search data displayed based on frequency of search categories across multiple geographic locations at a third resolution.

FIG. 5C shows a view 504 of the map portion 402 displaying the counties of Washington. Each search query 200 may be mapped to a geographic region, such as a county, based on the geolocation 204 associated with that search query 200. The mapping may be performed by using a lookup table that correlates to locations or ranges of geolocations (e.g., a range of latitudes and longitudes) with a geographic region. The latitude and longitude for a specific search query 200 may be provided to the lookup table and the geographic region to which that geolocation belongs is retrieved. Alternately or additionally, a geographic information system (GIS) may be used to correlate individual geolocations with geographic regions. The GIS may implement a bounding system that maps latitudes and longitudes to geographic regions. Depending on how the geolocation 204 is derived from the raw search queries 104 there may be some softening of borders particularly for smaller geographic regions. For example, reverse IP lookup may provide only approximate location and with a median error of about 0.25 km.

FIG. 5D shows a view 506 of the map portion 402 displaying the cities and unincorporated regions 508 of King County a county in Washington. In some implementations, the level of zoom or the resolution of the smallest graphic regions that can be viewed may be limited to protect privacy and present data only in relatively large aggregates. The query analysis system 110 may set the smallest geographic region to be one that includes a minimum number of search queries such as 1000, 5000, 10,000, etc. or a minimum population size such as 50,000 or 100,000. To do this, the map portion 402 may group certain geographic regions together to create an aggregate geographic region. For example, two cities with populations of 30,000 each may be aggregated together to create a single geographic region with a total population of 60,000 people. Additionally, data may be available on the level of metropolitan areas but not separated into the resolution of individual cities. This type of aggregation and minimum map resolution may apply whether the geographic regions are based on political boundaries or any other type of divisions.

In some implementations, the search queries 200 may be grouped according to the smallest geographic region available. The values displayed in the map portion 402 for larger geographic regions may be calculated from weighted averages of the subunit geographic regions. For example, the frequency of search queries for a particular category in a state may be derived from averaging the frequency of the search queries for each of the counties of that state accounting for the relative populations of those counties. Similarly, the states or provinces of a country may be the basis for calculating that values displayed in a map showing the country as a whole. Associating the search queries 200 by geolocation 204 with the smallest available geographic region may reduce the amount of data that needs to be stored and may speed processing when calculating search query frequency values for larger geographic regions.

Figure 6A:
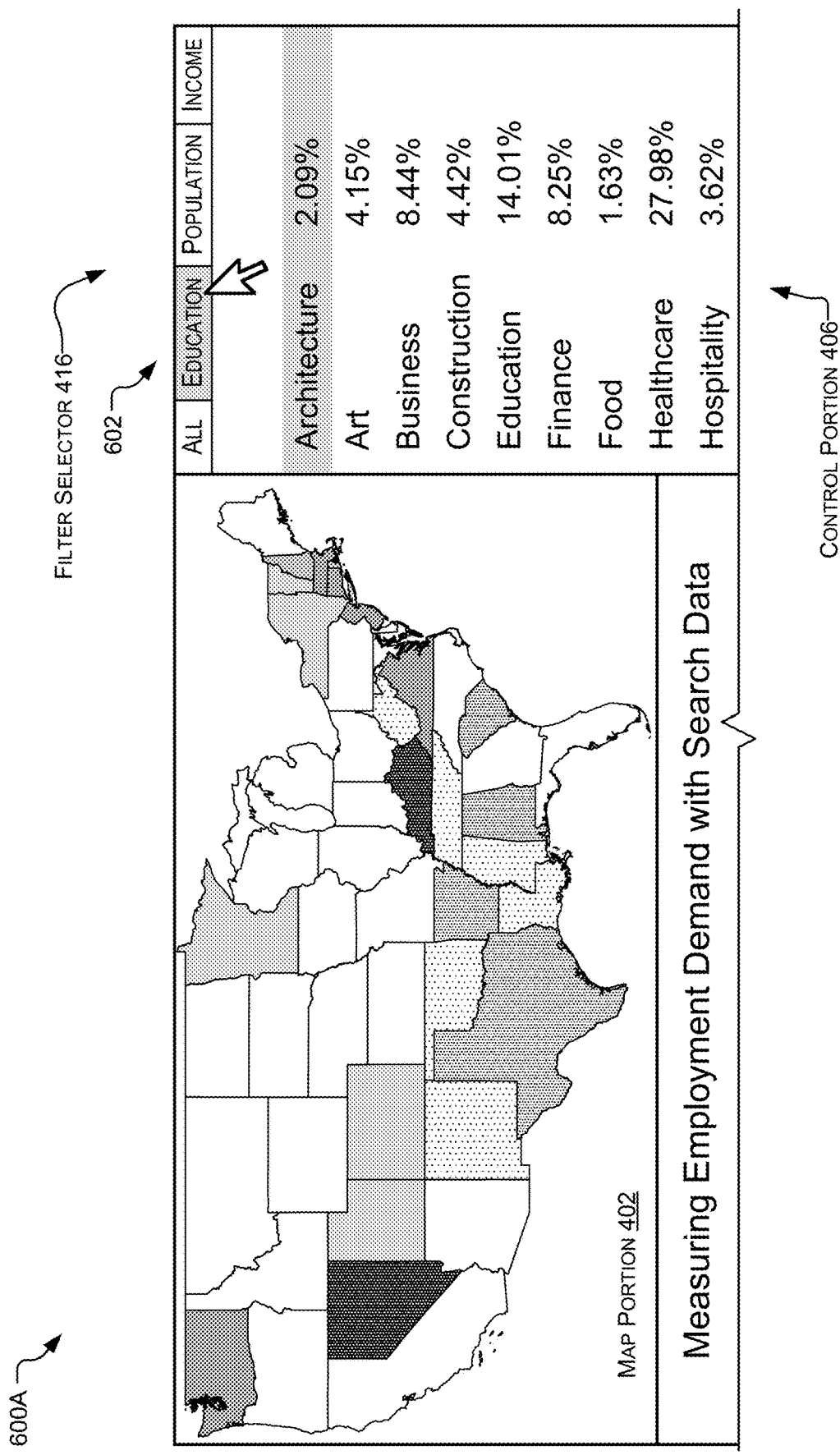
FIG. 6A shows an illustrative UI representing search data displayed geographically and filtered based on a first filter criterion.
Figure 6B:
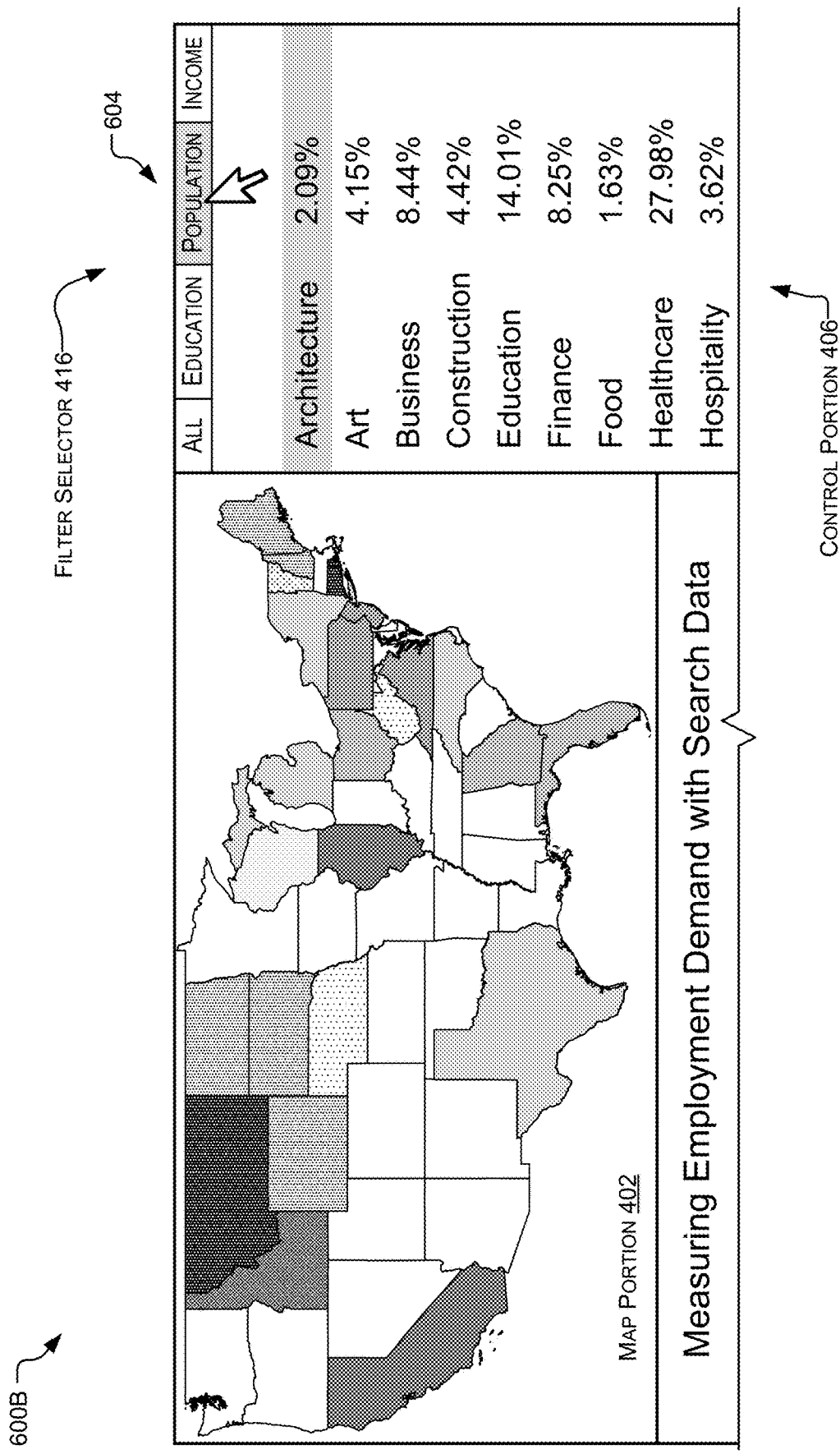
FIG. 6B shows the UI of FIG. 6A with the search data filtered based on a second filter criterion.
Figure 6C:
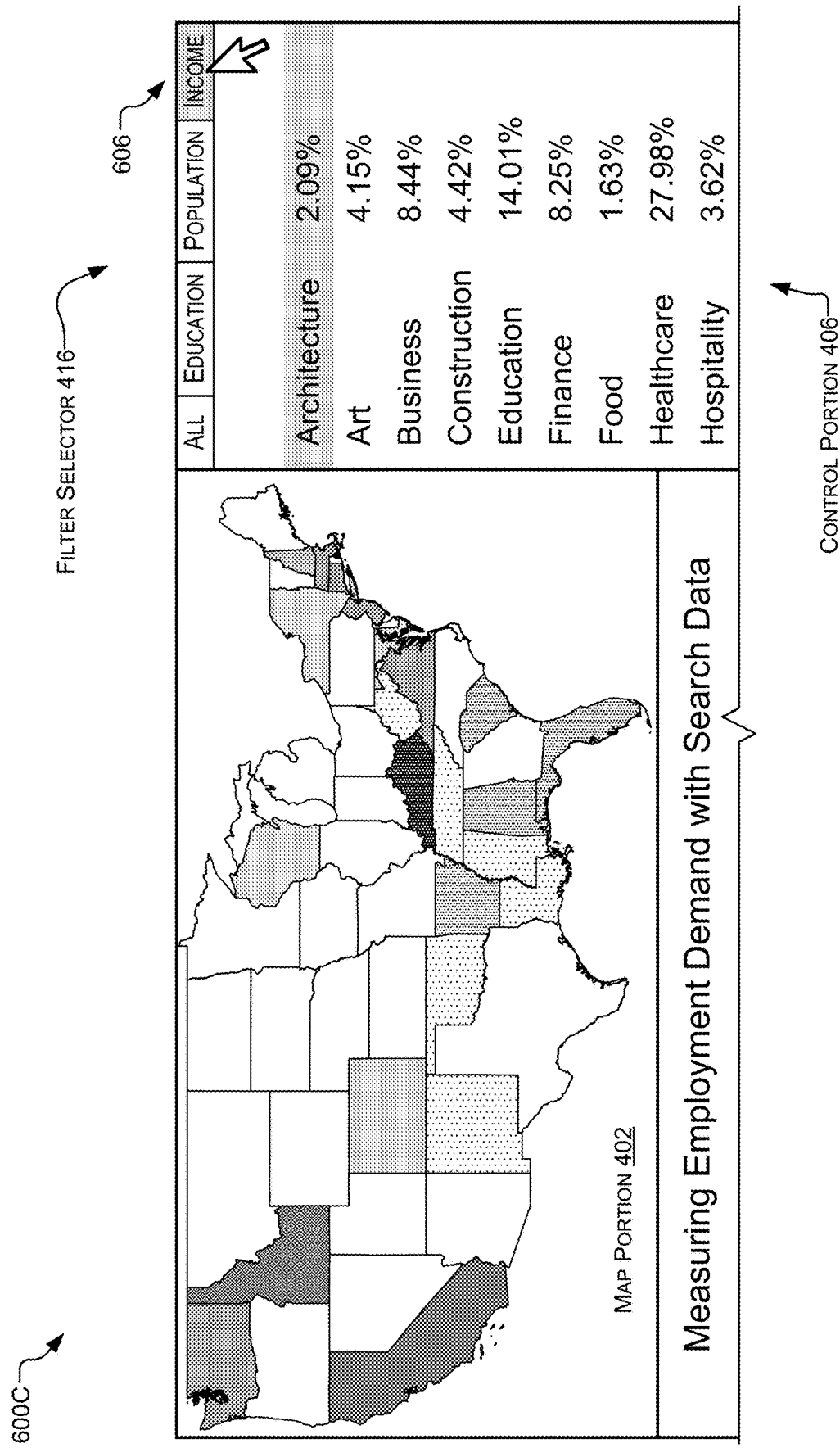
FIG. 6C shows the UI of FIG. 6A with the search data filtered based on a third filter criterion.

FIG. 6A-6C show the effects of applying a filter on the data displayed in the map portion 402 of the UI 400. The filter filters the data presented in the map portion 402 based on a characteristic of the geographic regions. Thus, the filter is not based on the query contents 202 but rather is based on an attribute of the areas from which the search queries originate. In this example, the filter criteria are the socio-economic characteristics of education, population, and income. Applying a filter may exclude data from the map portion 402 that does not satisfy the filter criterion. Thus, a filter may reduce and simplify the data displayed in the map portion 402. Additionally or alternatively, a filter may indicate that values of a geographic region for the filter criteria.

FIG. 6A shows a view 600A of the user interface 400 emphasizing the map portion 402 and the control portion 406. In the control portion 406, the filter selector 416 for education 602 is selected. Selection of the filter for education 602 filters the content displayed in the map portion 402 based on education levels of the geographic regions. In this example, the geographic regions are states of the continental U.S. The data for educational level, or for any filter, may come from an external datastore such as the datastore 112 introduced in FIG. 1.

The filtering may be applied in a number of different ways. Each geographic region may be assigned a value with respect to the criterion of the filter. For example, the educational level of a state may be represented as the percent of the total population with a bachelor's degree. The filtering may exclude certain sets of data from the visualization in the map portion 402 (e.g., those states with an educational level below/above a certain threshold). For example, the frequency of searches for a particular category (e.g. jobs in architecture) in geographic regions that are excluded by the filter may be omitted. Thus, the states shown in white in view 600A are those geographic regions that do not meet the filter criterion and are excluded from the UI. This creates a simplified view that allows the user 120 to focus his or her attention on a particular subset of the data.

The geographic regions that satisfy the filter criteria may be displayed differently based on the value of that filter criterion for each geographic region. For example, the filter based on education 602 may show the geographic regions with both the highest and the lowest educational levels. The highest and lowest levels of the filter criterion may be represented as the highest and lowest 10% (i.e. deciles), highest and lowest 25% (i.e. quartiles), highest and lowest 33% (i.e., terciles), or other ranges. Using a filter to highlight the extremes of a range for the filter criterion may be useful to emphasize how this criterion affects the search queries. Using this example, filtering by education may show how search queries for jobs in architecture vary between the most educated states and the least educated states. The change in the display may include changing the color or type of shading used to differentiate those geographic regions at the high-end of the filter criterion from those at the low end of the filter criterion.

In this view 600A, the states with the highest educational levels are shown using gray shading. The states with the lowest educational levels are shown using stippling. The threshold for the filter criterion of education 602 is the highest and lowest 25% such that 12 of the 48 continental states with the highest educational levels and 12 with the lowest educational levels are shown in the map portion 402. The darkness of the shading or the intensity of the stippling correlates with the frequency of searches for architecture jobs as shown in previous figures. Thus, of the "low-education" states Nevada and Kentucky have a high frequency of search queries for architecture jobs. Whereas, in the "high-education" states, Utah and Colorado have a relatively low frequency of search queries for architecture jobs.

FIG. 6B shows a view 600B in which the filter selector 416 is changed to population 604. With this change, the geographic regions that are emphasized in the map portion 402 changes. Population 604, like education 602, or other filter criterion can take a range of values and each geographic region may be associated with its respective value. In this view 600B, the most populous quartile of the states in the continental U.S. (12 states) and the least populous quartile of states (12 states) are visually emphasized in the map portion 402. States with the middle two quartiles of population are shown in white indicating that data on the frequency of search queries is omitted for the states. The visual emphasis is different for the high population states versus the low population states. The high population states are shown using various levels of gray shading with the darkness of the shading corresponding with the frequency of search queries for architecture jobs. The low population states are shown using stippling with the density of the stippling corresponding with the frequency of search queries for architecture jobs. Thus, this view 600B shows that there is a high percentage of search queries for architecture jobs in the high population states of California and Illinois and a high percentage in the low population states of Montana and Connecticut.

FIG. 6C shows a view 600C in which the filter selector 416 is changed to income 606. Income 606 may be measured as the annual average income per person in the geographic region. This change in the filter criterion again changes which geographic regions receive visual emphasis and which geographic regions are shown with search query frequencies omitted. In any of the views 600A, 600B, or 600C, the selected category of search queries may also be changed using the control portion 406 while retaining the selection made in the filter selector 416. Instead of showing the percentage of search queries for jobs in architecture filtered by income 606, the data displayed in the map portion 402 may be changed to show the percentage of search queries for jobs in art, business, construction, etc. still filtered by income 606. Thus, the UI 400 provides at least two different dimensions on which the content in the map portion 402 can be manipulated: (1) by category of search queries and (2) by characteristic of the geographic regions.

FIGS. 7, 8, 9A, and 9B show illustrative methods 700, 800, and 900 for implementing features of this disclosure. It also should be understood that the illustrated methods can end at any time and need not be performed in their entireties. Some or all operations of the methods, and/or substantially equivalent operations, can be performed by execution of computer-readable instructions included on a computer-readable storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

For example, the operations of the methods 700, 800, or 900 can be implemented by dynamically linked libraries ("DLLs"), statically linked libraries, functionality produced by an application programming interface ("API"), a compiled program, an interpreted program, a script, a network service or site, or any other executable set of instructions. Data can be stored in a data structure in one or more memory components. Data can be retrieved from the data structure by addressing links or references to the data structure.

Although the following illustration may refer to the components of the FIGURES, it can be appreciated that the operations of the methods 700, 800, or 900 may be also implemented in many other ways. For example, the methods 700, 800, or 900 may be implemented, at least in part, by a processor of another remote computer, processor or circuit. In addition, one or more of the operations of the methods 700, 800, or 900 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

Figure 7:
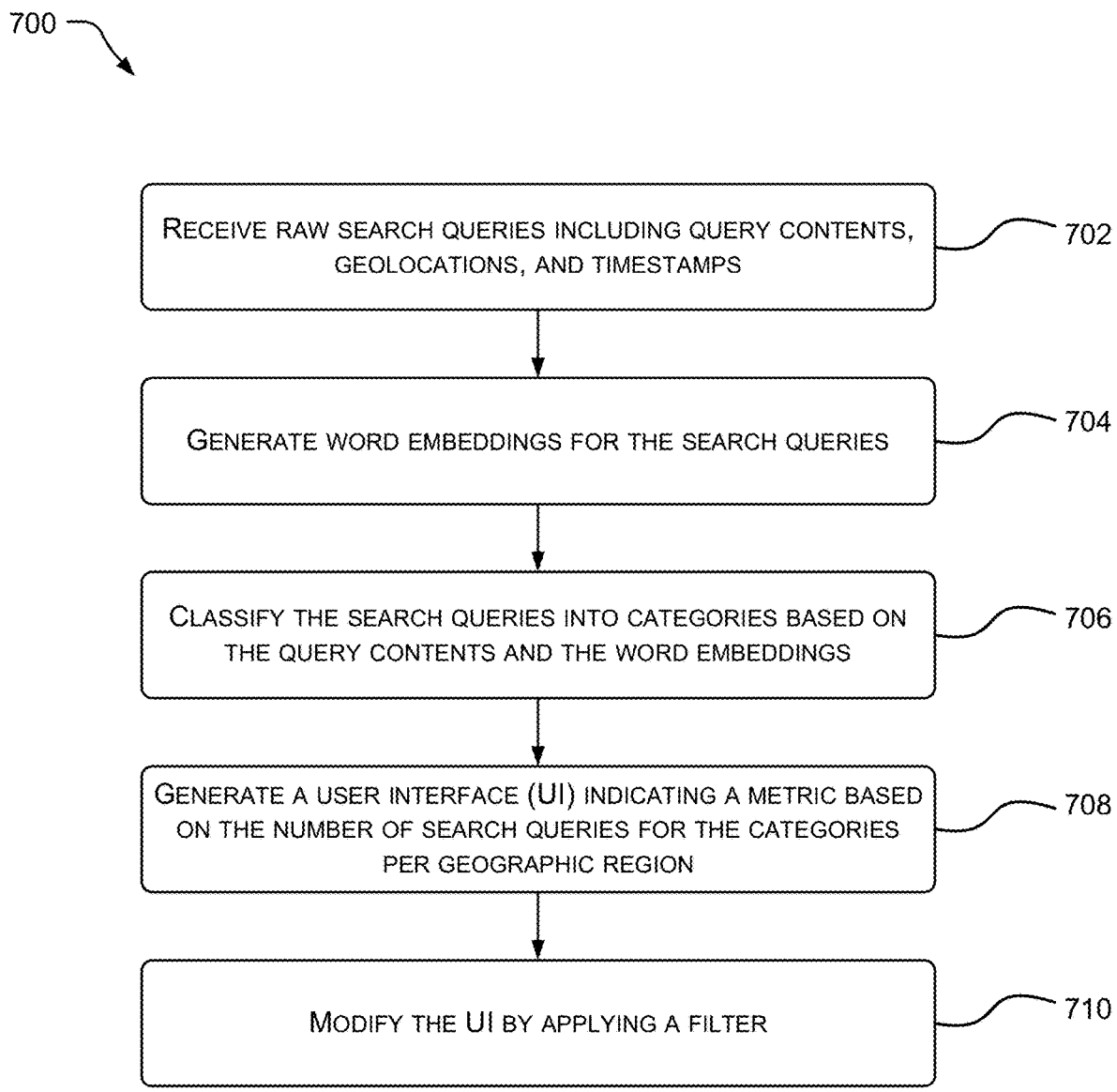
FIG. 7 is a flow diagram of an illustrative process for classifying and visualizing search queries based on geolocation.

FIG. 7 shows an illustrative method 700 for generating and modifying a UI showing types and frequencies of raw search queries.

At 702, a plurality of raw search queries including query contents and one or more of geolocations and timestamps are received. The raw search queries may be received from the searchers 102 introduced in FIG. 1. Alternately, the raw search queries may be received from a search service 106. The raw search queries may be received in substantially real-time as the raw search queries are generated by the searchers 102. For example, the raw search queries may be job search queries. In an implementation, the raw search queries comprise Internet searches and the geolocations may be determined by reverse IP lookup.

At 704, word embeddings or other vector representations are generated for the plurality of raw search queries. The word embeddings may be generated by the vectorization module 308 introduce in FIG. 3.

At 706, the plurality of raw search queries are classified into one of a plurality of categories based on the query contents and the word embeddings. The classification may be performed by the machine learning classifier 312 introduced in FIG. 3.

At 708, a UI is generated. The UI indicates a metric derived at least in part from the number of the raw search queries for the plurality of categories for one or more of the geographic regions represented in the UI. For example, the metric may be a frequency of the raw search queries in each of the plurality of categories relative to the total number of categorized search queries. Additionally, the metric may be a median or mean number of search queries per time period (e.g., searches for business jobs per week). As an additional example, the metric may be a maximum or minimum number search queries per time range within a larger time period (e.g., maximum number of construction job searches per week throughout a year).

In an implementation, a UI indicating the metric of the raw search queries may be updated substantially in real time as new search queries are received. The plurality of categories may comprise job categories such as those discussed above. In an implementation, the UI is a map that includes at least a subset of the plurality of geographic regions and the metric based on the number of the raw search queries is represented in the UI by the visual characteristic of individual ones of the subset of the plurality of geographic regions. If the raw search queries include timestamps, the UI may display a change over time as the value of the metric of search queries for respective ones of the plurality of categories At 710, the UI is modified by applying a filter. The filter removes data values for the geographic regions represented by the UI based on the criterion of the filter. In an implementation, the filter may be a socio-economic dimension of the geographic regions represented in the UI (e.g., education, population, income, age, etc.).

Figure 8:
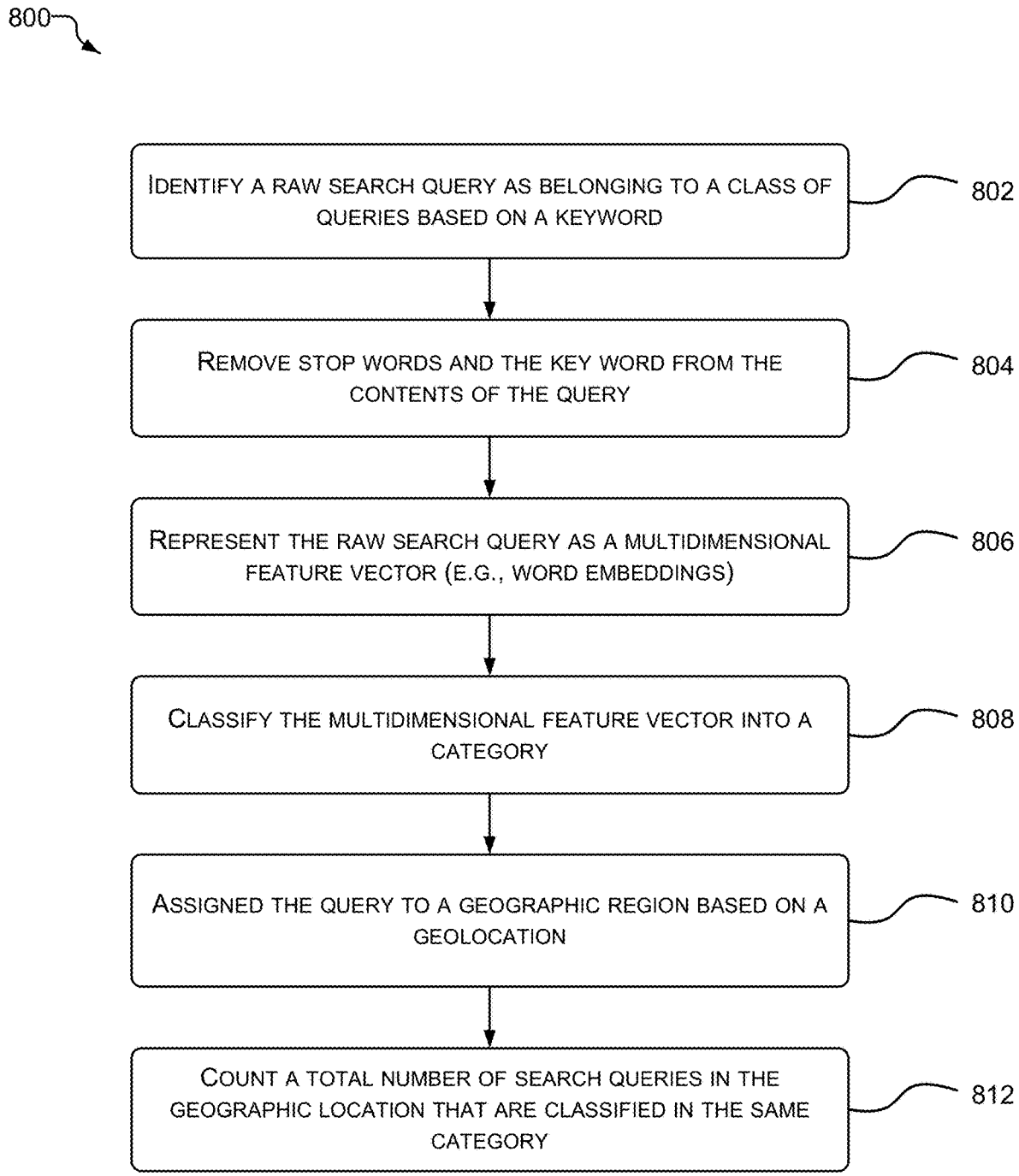
FIG. 8 is a flow diagram of an illustrative process for classifying a raw search query.

FIG. 8 shows method 800 for classifying a search query.

At 802, a raw search query is identified as belonging to a general class of queries based on a keyword present in the query contents of the raw search query. The raw search query may be identified in this way by use of the keyword(s) filtering module 300 introduced in FIG. 3.

At 804, stop words and keywords are removed from the query contents of the raw search query. Stop words and keywords may be removed from the query contents by the stop word removal module 304.

At 806, a multidimensional feature vector is generated for the raw search query from the word embeddings and the query contents. The multidimensional feature vector may be generated by the vectorization module 308. Vectorization may be performed on the raw search query after removal of the stop words and the keyword(s). For example, the multidimensional feature vector may be a 300-dimensional feature vector. Any of multiple different techniques may be used to generate a multidimensional feature vector from the raw search query. For example, the multidimensional feature vector may be generated with word embedding as described above or by another technique such as bag-of-words (BOW) to vectorize the query contents. In an implementation, the raw search query is a query directed to an Internet search engine and the word embeddings are generated by a neural network trained on other Internet search queries.

At 808, the multidimensional feature vector is classified into one of a plurality of categories using the machine learning classifier. The machine learning classifier may be the machine learning classifier 312 introduced in FIG. 3. In an implementation, the machine learning classifier may be a SVM trained on labeled data. For example, the categories may be architecture, art, business, construction, education, finance, food, healthcare, hospitality, manufacturing, retail, science, technology, and transportation.

At 810, the raw search query may be assigned to a geographic region based on a geolocation that is included in the raw search query. The geolocation may be included in the raw search query as metadata such as an IP address or as a latitude and longitude.

At 812, a total number of search queries, including the raw search query, in the geographic region from 810 that are classified in the same one of the plurality of categories are counted. This count may be compared to the count of search queries for the same geographic region for other categories to determine the relative frequency, or percent of total categorized searches, of search queries for each category for that geographic region.

Figure 9A:
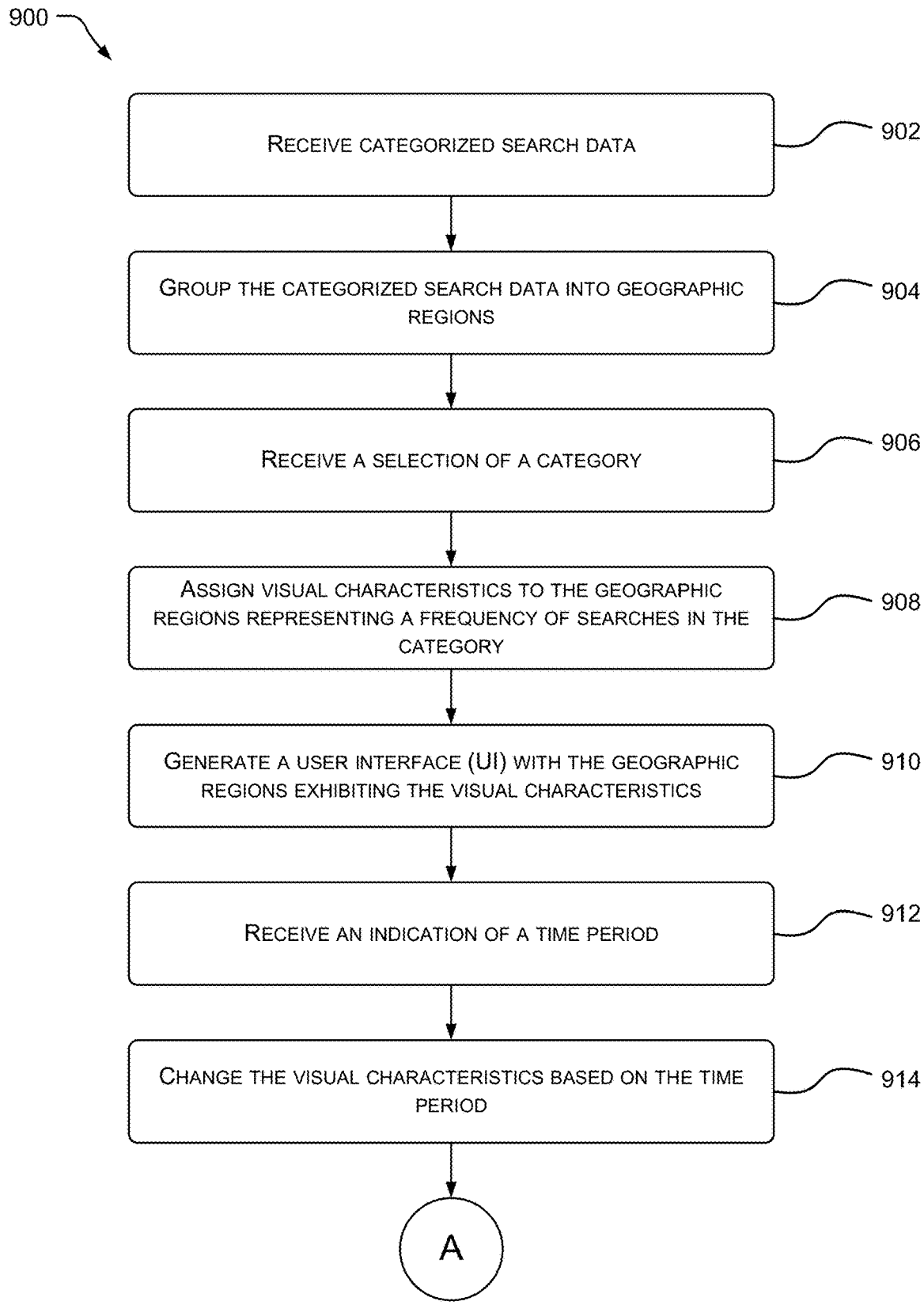
FIGS. 9A and 9B are a flow diagram of an illustrative process for generating a user interface that shows geographic distribution of search queries.
Figure 9B:
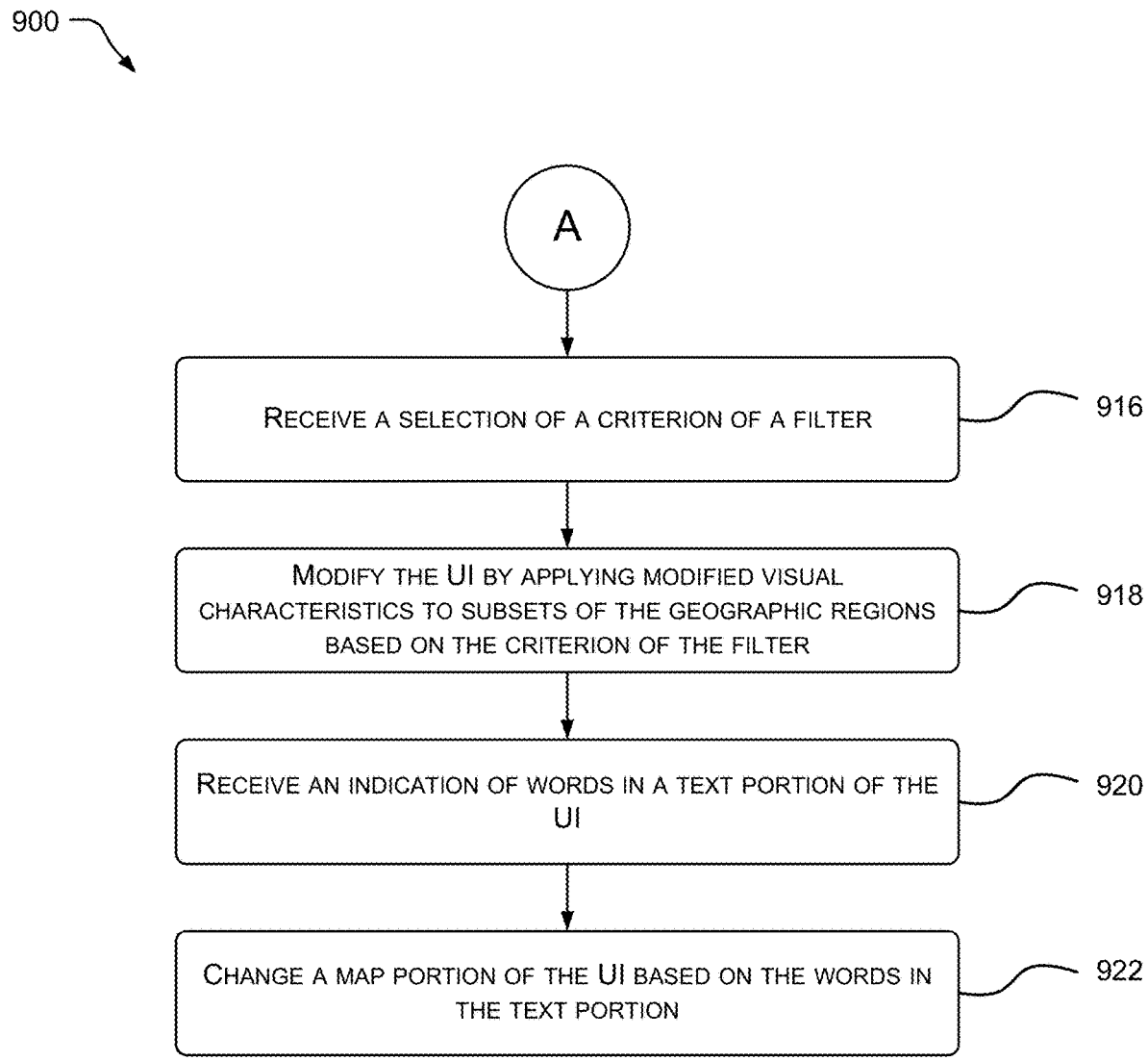

FIGS. 9A and 9B show a method 900 for generating and modifying a UI.

At 902, categorized search data including categories and geolocations for a plurality of searches is received. The categorized search data may be search data that is categorized using a machine learning classifier that analyzes word embedding generated from query contents of the plurality of searches. The categorized search data may be received, for example, from method 800.

At 904, the categorized search data is grouped into a plurality of geographic regions based on the geolocations.

At 906, a selection of a single category of the categories is received.

At 908, visual characteristics are assigned to the geographic regions, the visual characteristics represent a frequency of searches in the plurality of searches categorized in a single category relative to the frequency of searches in the single category in other geographic regions. Thus, the visual characteristics show in which geographic regions the category of search queries is more or less common.

At 910, a UI is generated that includes representations of the geographic regions with respect to visual characteristics. The UI may be generated by the user interface module 114 introduced in FIG. 1. The UI may include a map portion, a text portion, and or a control portion. In an implementation, the UI may be the same or similar to the UI shown in FIG. 4. The geographic regions shown in the map portion of the UI may be counties, states, provinces, countries, metropolitan regions, or cities. The units used for the geographic regions shown in the map portion of the UI may change with a zoom level applied to the map portion of the UI. For example, the change may be the same or similar to the change shown in FIG. 5.

At 912, an indication of a time period is received. The indication of the of the time period may be an indication of a day, week, month, a calendar quarter, year, or other time period. The indication may also include a range such as a range of hours, dates, months, or years. The categorized search data may include timestamps and the timestamps may be used to group or sort the plurality of searches. The indication of the time period may be received, for example, by a UI element such as the time range control 412 shown in FIG. 4C.

At 914, the visual characteristics of the geographic regions may be changed based on the time period. The change may a change to the coloring, shading, texturing or the like of the respective geographic regions based on the frequency of searches for a particular category during the selected time period. For example, selecting a time period from the past will show historical rates of searching behavior. By changing the selected time period trends and patterns in how the rate of searching for particular categories has changed can be visualized in the UI. This may also be used to predict or forecast future changes.

Continuing to FIG. 9B, at 916, a selection of a criterion of a filter is received. The selection may be received from interaction with a UI element such as the filter selector 416 of the control portion 406 shown in FIG. 6.

At 918, the UI is modified based on the filter. The UI may be modified by applying a first modified visual characteristic to a first subset of the geographic regions and a second modified visual characteristic to a second subset of the geographic regions. The visual characteristic may be a color such as making some of the geographic regions red and others green, a texture such as making some of the geographic regions filled with stippling while others are filled with parallel lines, or another type of visual modification. The first subset of the geographic regions may include those geographic regions associated with an upper range of the criterion of the filter such as the top 10%, 25%, etc. of the geographic regions as sorted based on the filter criteria. The second subset of the geographic regions may include those G.I. regions associated with a lower range of the criterion of the filter such as the bottom 10%, 25%, etc. of the geographic regions sorted based on the filter criteria. Illustrative views of this type of modification to a UI are shown in FIGS. 6A, 6B, and 6C.

At 920, an indication of one or more words in a text portion of the UI is received. The selection may include selection or activation of a link. The text portion of the UI may be the same or similar as the text portion 404 shown in previous figures. Selection may be made using a cursor, a finger, or other user interface element. An example of selecting text in the text portion is shown in FIG. 4F.

At 922, the map portion of the UI is changed based on the word selected at 920. The change corresponds to the content selected in the text portion of the UI. For example, the change may be the selection of the single category (e.g., job category such as architecture or art) of search queries that is displayed in the map portion of the UI, change in the criterion of the filter applied to the map portion of the UI, or change in the geographic regions (e.g., showing counties instead of states) included within the map portion of the UI. An example of a change to the map portion 402 of the UI in response to selection of words in the text portion 404 is shown in FIG. 4F.

The particular implementation of the technologies disclosed herein is a matter of choice dependent on the performance and other requirements of the computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the FIGURES and described herein. These operations can also be performed in a different order than those described herein.

Figure 10:
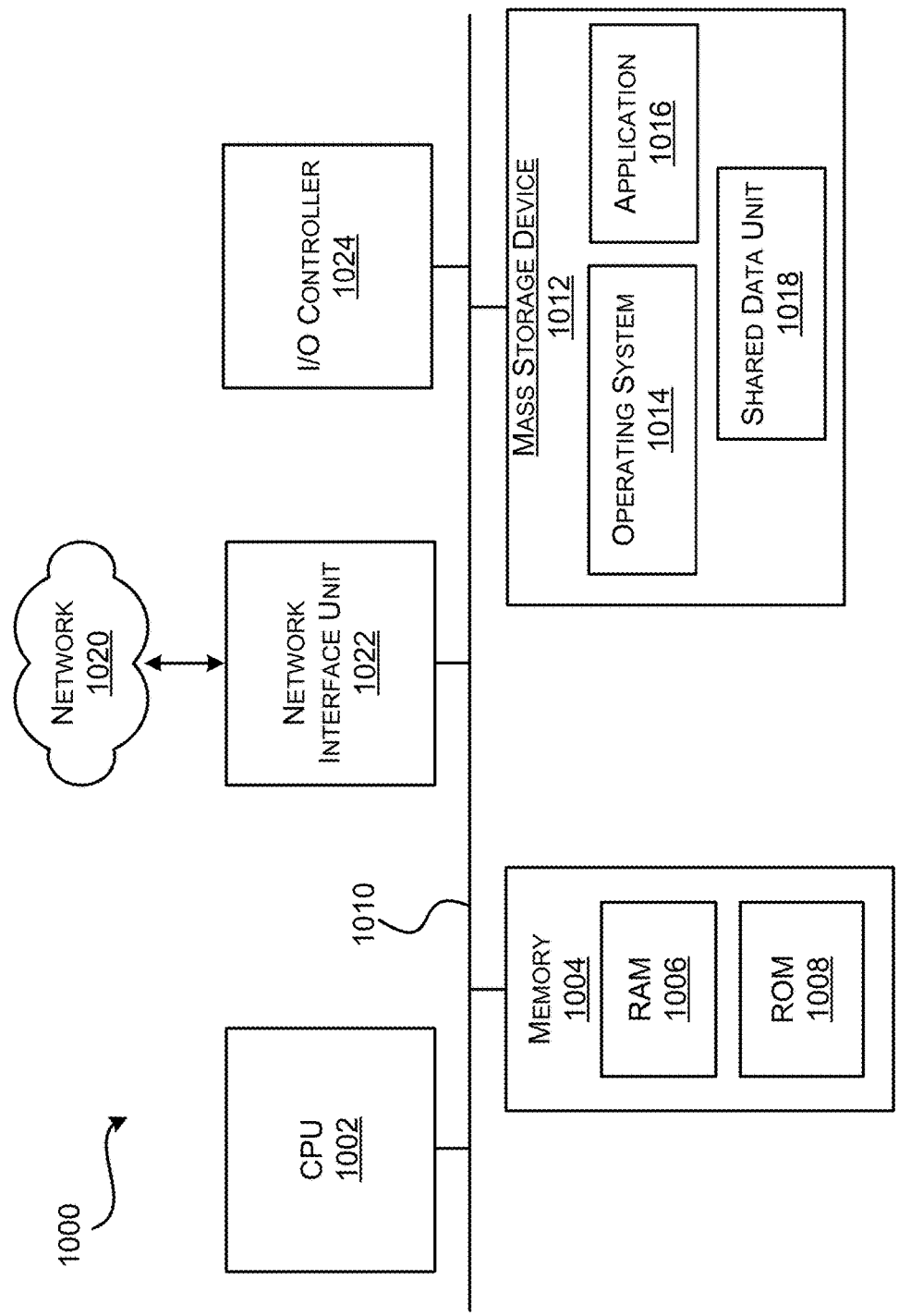
FIG. 10 is a computer architecture diagram illustrating an illustrative computer hardware and software architecture for a computing system capable of implementing aspects of the techniques and technologies presented herein.

FIG. 10 shows details of an example computer architecture 1000 for a computer, such as the computing device 118, the search service 106, or the query analysis system 110 shown in FIG. 1, capable of executing the program components described herein. Thus, the computer architecture 1000 illustrated in FIG. 10 illustrates an architecture for a server computer, a mobile phone, a PDA, a smartphone, a desktop computer, a netbook computer, a tablet computer, and/or a laptop computer. The computer architecture 1000 may be utilized to execute any aspects of the software components presented herein.

The computer architecture 1000 illustrated in FIG. 10 includes a central processing unit 1002 ("CPU"), a system memory 1004, including a random access memory 1006 ("RAM") and a read-only memory ("ROM") 1008, and a system bus 1010 that couples the memory 1004 to the CPU 1002. The CPU 1002 may be implemented as any type of processor or processing units including single and multicore configurations. A basic input/output system (BIOS) containing the basic routines that help to transfer information between elements within the computer architecture 1000, such as during startup, is stored in the ROM 1008. The computer architecture 1000 further includes a mass storage device 1012 for storing an operating system 1014, an application 1016 such as a query analysis application, a shared data unit 1018 containing data such as search queries 200, and other data described herein.

The mass storage device 1012 is connected to the CPU 1002 through a mass storage controller (not shown) connected to the bus 1010. The mass storage device 1012 and its associated computer-readable media provide non-volatile storage for the computer architecture 1000. Although the description of computer-readable media contained herein refers to a mass storage device, such as a solid-state drive, a hard disk or a CD-ROM drive, it should be appreciated by those skilled in the art that computer-readable media can be any available computer-readable storage media or communication media that can be accessed by the computer architecture 1000.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

By way of example, and not limitation, computer-readable storage media may include volatile and non-volatile, removable and non-removable media implemented in any method or technology for storage of information such as computer-readable instructions, data structures, program modules or other data. For example, computer-readable storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information, and which can be accessed by the computer architecture 1000. For purposes of the claims, the phrase "computer-readable storage medium" does not include waves, signals, and/or other transitory and/or intangible communication media, per se.

According to various configurations, the computer architecture 1000 may operate in a networked environment using logical connections to remote computers through a network 1020. The computer architecture 1000 may connect to the network 1020 through a network interface unit 1022 connected to the bus 1010. The computer architecture 1000 also may include an input/output controller 1024 for receiving and processing input from a number of other devices, including a keyboard, mouse, touch, or electronic stylus or pen. Similarly, the input/output controller 1024 may provide output to a display screen, a printer, or other type of output device. The output may include the UI 122 or the UI 400.

It should be appreciated that the software components described herein may, when loaded into the CPU 1002 and executed, transform the CPU 1002 and the overall computer architecture 1000 from a general-purpose computing system into a special-purpose computing system customized to facilitate the functionality presented herein. The CPU 1002 may be constructed from any number of transistors or other discrete circuit elements, which may individually or collectively assume any number of states. More specifically, the CPU 1002 may operate as a finite-state machine, in response to executable instructions contained within the software modules disclosed herein. These computer-executable instructions may transform the CPU 1002 by specifying how the CPU 1002 transitions between states, thereby transforming the transistors or other discrete hardware elements constituting the CPU 1002.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 1000 in order to store and execute the software components presented herein. It also should be appreciated that the computer architecture 1000 may include other types of computing devices, including hand-held computers, embedded computer systems, personal digital assistants, and other types of computing devices known to those skilled in the art. It is also contemplated that the computer architecture 1000 may not include all the components shown in FIG. 10, may include other components that are not explicitly shown in FIG. 10, or may utilize an architecture completely different than that shown in FIG. 10.

Figure 11:
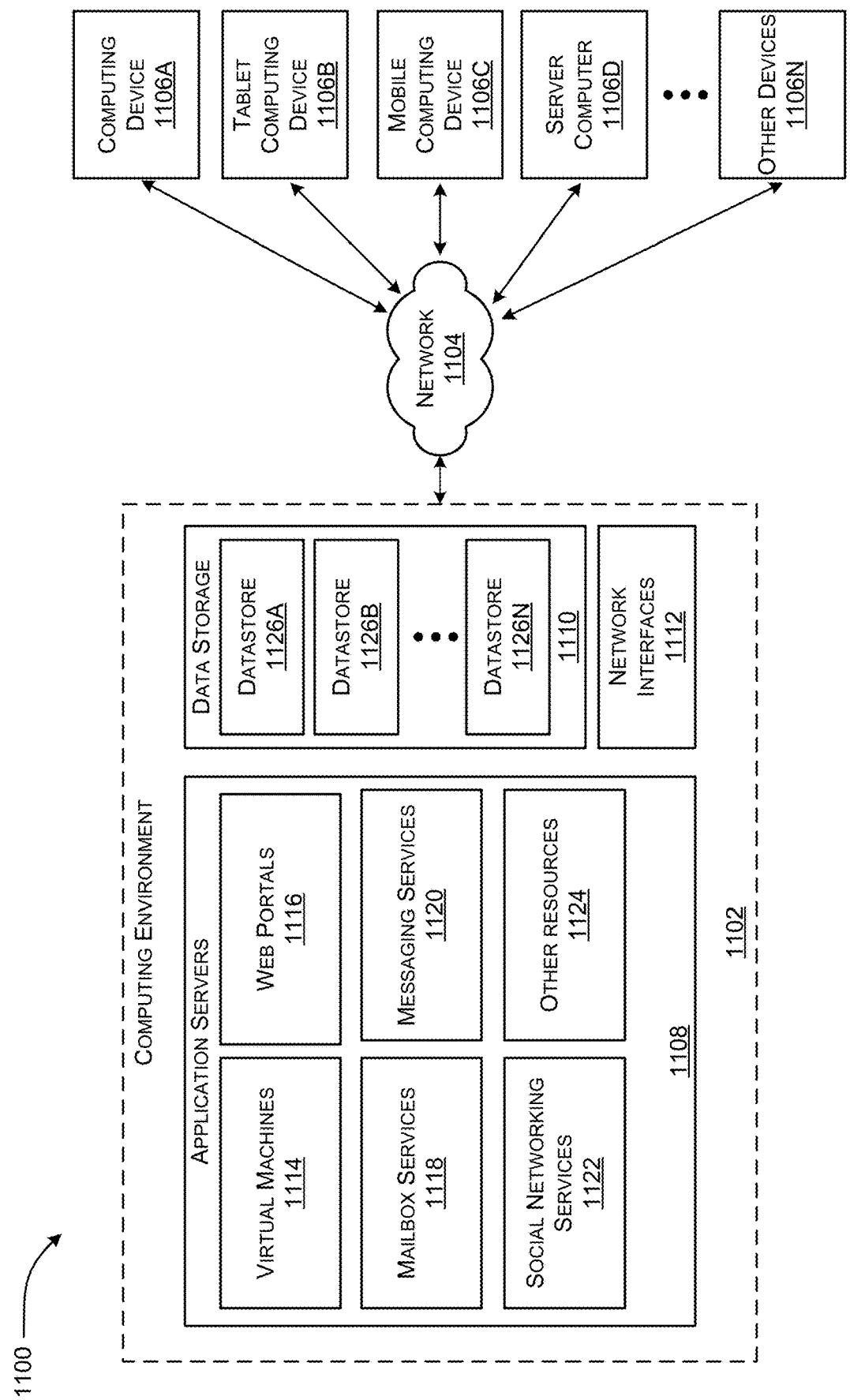
FIG. 11 is a diagram illustrating a distributed computing environment capable of implementing aspects of the techniques and technologies presented herein.

FIG. 11 depicts an illustrative distributed computing environment 1100 capable of executing the software components described herein. Thus, the distributed computing environment 1100 illustrated in FIG. 11 can be utilized to execute any aspects of the software components presented herein.

According to various implementations, the distributed computing environment 1100 includes a computing environment 1102 operating on, in communication with, or as part of the network 1104. One or more client devices 1106A-1006N (hereinafter referred to collectively and/or generically as "clients 1106" and also referred to herein as computing devices 1106) can communicate with the computing environment 1102 via the network 1104.

In one illustrated configuration, the clients 1106 include a computing device 1106A such as a laptop computer, a desktop computer, or other computing device; a slate or tablet computing device ("tablet computing device") 1106B; a mobile computing device 1106C such as a mobile telephone, a smartphone, or other mobile computing device; a server computer 1106D; and/or other devices 1106N. It should be understood that any number of clients 1106 can communicate with the computing environment 1102.

In the illustrated configuration, the computing environment 1102 includes application servers 1108, data storage 1110, and one or more network interfaces 1112. According to various implementations, the functionality of the application servers 1108 can be provided by one or more server computers that are executing as part of, or in communication with, the network 1104. The application servers 1108 can host various services, virtual machines, portals, and/or other resources. In the illustrated configuration, the application servers 1108 host one or more virtual machines 1114 for hosting applications or other functionality. According to various implementations, the virtual machines 1114 host one or more applications and/or software modules for implementing aspects of the functionality disclosed herein. It should be understood that this configuration is illustrative and should not be construed as being limiting in any way. The application servers 1108 can also host or provide access to one or more portals, link pages, Web sites, and/or other information ("web portals") 1116.

According to various implementations, the application servers 1108 also include one or more mailbox services 1118 and one or more messaging services 1120. The mailbox services 1118 can include electronic mail ("email") services. The mailbox services 1118 also can include various personal information management ("PIM") and presence services including, but not limited to, calendar services, contact management services, collaboration services, and/or other services. The messaging services 1120 can include, but are not limited to, instant messaging services, chat services, forum services, and/or other communication services.

The application servers 1108 also may include one or more social networking services 1122. The social networking services 1122 can include various social networking services including, but not limited to, services for sharing or posting status updates, instant messages, links, photos, videos, and/or other information; services for commenting or displaying interest in articles, products, blogs, or other resources; and/or other services.

As shown in FIG. 11, the application servers 1108 also can host other services, applications, portals, and/or other resources ("other resources") 1124. The other resources 1124 can include, but are not limited to, mapping, machine learning, query analysis, rendering or any other functionality. It thus can be appreciated that the computing environment 1102 can provide integration of the concepts and technologies disclosed herein with various webpages, mailbox, messaging, social networking, and/or other services or resources.

As mentioned above, the computing environment 1102 can include the data storage 1110. According to various implementations, the functionality of the data storage 1110 is provided by one or more databases operating on, or in communication with, the network 1104. The functionality of the data storage 1110 also can be provided by one or more server computers configured to host data for the computing environment 1102. The data storage 1110 can include, host, or provide one or more real or virtual datastores 1126A-1026N (hereinafter referred to collectively and/or generically as "datastores 1126"). The datastores 1126 are configured to host data used or created by the application servers 1108 and/or other data. Although not illustrated in FIG. 11, the datastores 1126 also can host or store web page documents, word documents, search queries, data structures, algorithms for execution by a recommendation engine, and/or other data utilized by any application program or another module. Aspects of the datastores 1126 may be associated with a service for storing data units such as files.

The computing environment 1102 can communicate with, or be accessed by, the network interfaces 1112. The network interfaces 1112 can include various types of network hardware and software for supporting communications between two or more computing devices including, but not limited to, the computing devices and the servers. It should be appreciated that the network interfaces 1112 also may be utilized to connect to other types of networks and/or computer systems.

It should be understood that the distributed computing environment 1100 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 1100 provides the software functionality described herein as a service to the computing devices. It should also be understood that the computing devices can include real or virtual machines including, but not limited to, server computers, web servers, personal computers, mobile computing devices, smartphones, and/or other devices. As such, various configurations of the concepts and technologies disclosed herein enable any device configured to access the distributed computing environment 1100 to utilize the functionality described herein for providing the techniques disclosed herein, among other aspects. In one specific example, as summarized above, techniques described herein may be implemented, at least in part, by a web browser application, which works in conjunction with the application servers 1108 of FIG. 11.

ILLUSTRATIVE EMBODIMENTS

The following clauses described multiple possible embodiments for implementing the features described in this disclosure. The various embodiments described herein are not limiting nor is every feature from any given embodiment required to be present in another embodiment. Any two or more of the embodiments may be combined together unless context clearly indicates otherwise. As used herein in this document "or" means and/or. For example, "A or B" means A without B, B without A, or A and B. As used herein, "comprising" means including all listed features and potentially including addition of other features that are not listed. "Consisting essentially of" means including the listed features and those additional features that do not materially affect the basic and novel characteristics of the listed features. "Consisting of" means only the listed features to the exclusion of any feature not listed.

Clause 1. A system for classifying and visualizing search queries based on geolocation, the system comprising: one or more processing units; and memory storing computer-executable instructions that, when executed by the one or more processing units, cause the system to perform acts comprising: receiving a plurality of raw search queries including query contents and geolocations; generating word embeddings for the plurality of raw search queries; classifying the plurality of raw search queries into one of a plurality of categories based on the query contents and the word embeddings; determining a number of raw search queries for a plurality of geographic regions for respective ones of the plurality of categories based on results of the classifying and the geolocations; generating a user interface (UI) indicating a metric derived at least in part from the number of the raw search queries for the plurality of categories for ones of the geographic regions represented in the UI; and modifying the UI by applying a filter which removes data values for the geographic regions represented in the UI based on a criterion of the filter.

Clause 2. The system of clause 1, wherein the raw search queries comprise job search queries and the plurality of categories comprise job categories.

Clause 3. The system of clause 1 or 2, wherein the criterion of the filter comprises a socio-economic dimension of the geographic regions represented in the UI.

Clause 4. The system of any of clauses 1-3, wherein the raw search queries comprise Internet searches and the geolocations are determined by reverse Internet protocol (IP) lookup.

Clause 5. The system of any of clauses 1-4, wherein the raw search queries further include timestamps and the UI displays a change over time of the frequency of raw search queries per respective ones of the plurality of categories.

Clause 6. The system of any of clauses 1-5, wherein the UI comprises a map including at least a subset of the plurality of geographic regions and the metric of the raw search queries is represented in the UI by visual characteristics of individual ones of the subset of the plurality of geographic regions.

Clause 7. The system of any of clauses 1-6, wherein receiving the plurality of raw search queries occurs in substantially real-time as the raw search queries are generated and the UI indicating the metric of the raw search queries is updated substantially in real-time.

Clause 8. A method for classifying a raw search query: identifying the raw search query as belonging to a general class of queries based on a keyword present in query contents of the raw search query; representing the raw search query as a multidimensional feature vector; and classifying the multidimensional feature vector into one of a plurality of categories using a machine learning classifier.

Clause 9. The method of clause 8, further comprising removing stop words and the keyword from the query contents of the raw search query wherein the identifying word embeddings is performed on the raw search query after removal of the stop words and the keyword.

Clause 10. The method of clause 8 or 9, wherein the raw search query is a query directed to an Internet search engine and the word embeddings are generated by a neural network trained on other Internet search queries.

Clause 11. The method of any of clauses 8-10, wherein the machine learning classifier is a support vector machine trained on labeled data.

Clause 12. The method of any of clauses 8-11, wherein the plurality of categories includes architecture/engineering, art, business, construction, education, finance, food, healthcare, leisure/hospitality, manufacturing, retail, science, technology, and transportation.

Clause 13. The method of any of clauses 8-12, wherein the raw search query comprises a geolocation and further comprising: assigning the raw search query to a geographic region based on the geolocation; and counting a total number of search queries, including the raw search query, in the geographic region that are classified in a same one of the plurality of categories.

Clause 14. A computer-readable storage medium containing computer-readable instructions that, when executed by one or more processing units, cause the one or more processing units to perform the method of any of clauses 8-13.

Clause 15. A system comprising: one or more processing units; and memory storing computer-executable instructions that, when executed by the one or more processing units, cause the system to perform the method of any of clauses 8-13.

Clause 16. A computer-readable storage medium containing computer-readable instructions that, when executed by one or more processing units, cause the one or more processing units to perform acts comprising: receiving categorized search data comprising categories and geolocations for a plurality of searches; grouping the categorized search data into a plurality of geographic regions based on the geolocations; receiving a selection of a single category of the categories; assigning visual characteristics to the geographic regions, the visual characteristics representing a frequency of searches in the plurality of searches categorized in the single category relative to the frequency of searches in the single category in other geographic regions; and generating a user interface (UI) including representations of the geographic regions with the visual characteristics.

Clause 17. The computer-readable storage medium of clause 16, wherein the UI includes a map portion and the geographic regions shown in the map portion comprise one of a country, a state, a province, a county, a metropolitan region, or a city.

Clause 18. The computer-readable storage medium of clause 16 or 17, wherein the UI includes a map portion and a unit of the geographic regions changes with a zoom level applied to the map portion.

Clause 19. The computer-readable storage medium of any of clauses 16-18, wherein the categorized search data is categorized using a machine learning classifier that analyzes word embeddings generated from query contents of the plurality of searches.

Clause 20. The computer-readable storage medium of any of clauses 16-19, wherein the categorized search data further comprises timestamps and the computer-readable instructions cause the one or more processing units to perform further acts comprising: receiving an indication of a time period; and changing the visual characteristics based on the time period.

Clause 21. The computer-readable storage medium of any of clauses 16-20, wherein the computer-readable instructions cause the one or more processing units to perform further acts comprising: receiving a selection of a criterion of a filter; and modifying the UI by applying a first modified visual characteristic to a first subset of the geographic regions associated with an upper range of the criterion of the filter and applying a second modified visual characteristic to a second subset of the geographic regions associated with a lower range of the criterion of the filter.

Clause 22. The computer-readable storage medium of any of clauses 16-21, wherein the UI includes a map portion and a text portion and the computer-readable instructions cause the one or more processing units to perform further acts comprising: receiving an indication of one or more words in the text portion; and changing the map portion of the UI by changing the selection of the single category, a criterion of a filter applied to the map portion of the UI, or the geographic regions included within the map portion of the UI.

Clause 23. A system comprising: one or more processing units; and the computer-readable storage medium of any of clauses 16-22.

Clause 24. A system for classifying and visualizing search queries based on geolocation, the system comprising: means for processing; memory storing computer-executable instructions; means for receiving a plurality of raw search queries including query contents and geolocations; means for generating word embeddings for the plurality of raw search queries; means for classifying the plurality of raw search queries into one of a plurality of categories based on the query contents and the word embeddings; means for determining a number of raw search queries for a plurality of geographic regions for respective ones of the plurality of categories based on results of the classifying and the geolocations; means for generating a user interface (UI) indicating a metric derived at least in part from the number of the raw search queries for the plurality of categories for ones of the geographic regions represented in the UI; and means for modifying the UI by applying a filter which removes data values for the geographic regions represented in the UI based on a criterion of the filter.

CONCLUSION

For ease of understanding, the processes discussed in this disclosure are delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

Although the subject matter has been described in language specific to structural features and/or methodological acts, it is to be understood that the subject matter defined in the appended claims is not necessarily limited to the specific features or acts described above. Rather, the specific features and acts are disclosed as example forms of implementing the claims.

The terms "a," "an," "the" and similar referents used in the context of describing the invention (especially in the context of the following claims) are to be construed to cover both the singular and the plural, unless otherwise indicated herein or clearly contradicted by context. The terms "based on," "based upon," and similar referents are to be construed as meaning "based at least in part" which includes being "based in part" and "based in whole," unless otherwise indicated or clearly contradicted by context.

It should be appreciated that any reference to "first," "second," etc. users or other elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different users, two different virtual machines, etc.).

Certain embodiments are described herein, including the best mode known to the inventors for carrying out the invention. Of course, variations on these described embodiments will become apparent to those of ordinary skill in the art upon reading the foregoing description. Skilled artisans will know how to employ such variations as appropriate, and the embodiments disclosed herein may be practiced otherwise than specifically described. Accordingly, all modifications and equivalents of the subject matter recited in the claims appended hereto are included within the scope of this disclosure. Moreover, any combination of the above-described elements in all possible variations thereof is encompassed by the invention unless otherwise indicated herein or otherwise clearly contradicted by context.

The invention claimed is:

1. A system for classifying and visualizing search queries based on geolocation, the system comprising:
   one or more processing units; and
   memory storing computer-executable instructions that, when executed by the one or more processing units, cause the system to perform acts comprising:
   receiving a plurality of raw search queries including query contents and geolocations;
   generating word embeddings for the plurality of raw search queries;
   classifying the plurality of raw search queries into one of a plurality of categories based on the query contents and the word embeddings;
   determining a number of raw search queries for a plurality of geographic regions for respective ones of the plurality of categories based on results of the classifying and the geolocations;
   receiving a selection of a single category of the plurality of categories;
   determining a first percentage of search queries in the single category out of all the plurality of categories for all of a first set of geographic regions;
   generating a user interface (UI) containing the first set of geographic regions, wherein for individual ones of the plurality of geographic regions included in the first set of geographic regions, a difference between a percentage of search queries in the single category for each geographic region in the first set of geographic regions relative to the first percentage of search queries in the single category is indicated by a visual characteristic assigned to the individual ones of the first set of geographic regions;
   modifying the UI by changing a zoom level of the UI to show a second set of geographic regions in the UI;
   determining a second percentage of search queries in the single category out of all the plurality of categories for the second set of geographic regions; and
   modifying the UI containing the second set of geographic regions, wherein for individual ones of the second set of geographic regions, a difference between a percentage of searches in the single category for each geographic region in the second set of geographic regions relative to the second percentage of search queries in the single category for the second set of geographic regions is indicated by a visual characteristic assigned to the individual ones of the second set of geographic regions.

2. The system of claim 1, wherein the raw search queries comprise job search queries and the plurality of categories comprise job categories.

3. The system of claim 1, further comprising modifying the UI by applying a filter which removes data values for the geographic regions represented in the UI based on a criterion of the filter, wherein the criterion of the filter comprises a socio-economic dimension of the geographic regions represented in the UI.

4. The system of claim 1, wherein the raw search queries comprise Internet searches and the geolocations are determined by reverse Internet protocol (IP) lookup.

5. The system of claim 1, wherein the raw search queries further include timestamps and the UI displays a change over time of the frequency of raw search queries per respective ones of the plurality of categories.

6. The system of claim 1, wherein the UI comprises a map including at least a subset of the plurality of geographic regions.

7. The system of claim 1, wherein receiving the plurality of raw search queries occurs in substantially real-time as the raw search queries are generated and the UI is updated substantially in real-time.

8. A method for classifying and visualizing search queries based on geolocation, the method comprising:
   receiving a plurality of raw search queries including query contents and geolocations;
   generating word embeddings for the plurality of raw search queries;
   classifying the plurality of raw search queries into one of a plurality of categories based on the query contents and the word embeddings;
   determining a number of raw search queries for a plurality of geographic regions for respective ones of the plurality of categories based on results of the classifying and the geolocations;
   receiving a selection of a single category of the plurality of categories;
   determining a first percentage of search queries in the single category out of all the plurality of categories for all of a first set of geographic regions;
   generating a user interface (UI) containing the first set of geographic regions, wherein for individual ones of the plurality of geographic regions included in the first set of geographic regions, a difference between a percentage of searches in the single category for each geographic region in the first set of geographic regions relative to the first percentage of search queries in the single category is indicated by a visual characteristic assigned to the individual ones of the first set of geographic regions;

modifying the UI by changing a zoom level of the UI to show a second set of geographic regions in the UI;

determining a second percentage of search queries in the single category out of all the plurality of categories for the second set of geographic regions; and modifying the UI containing the second set of geographic regions, wherein for individual ones of the second set of geographic regions, a difference between a percentage of searches in the single category for each geographic region in the second set of geographic regions relative to the second percentage of search queries in the single category for the second set of geographic regions is indicated by a visual characteristic assigned to the individual ones of the second set of geographic regions.

9. The method of claim 8, wherein the raw search queries comprise job search queries and the plurality of categories comprise job categories.

10. The method of claim 8, further comprising modifying the UI by applying a filter which removes data values for the geographic regions represented in the UI based on a criterion of the filter, wherein the criterion of the filter comprises a socio-economic dimension of the geographic regions represented in the UI.

11. The method of claim 8, wherein the raw search queries comprise Internet searches and the geolocations are determined by reverse Internet protocol (IP) lookup.

12. The method of claim 8, wherein the raw search queries further include timestamps and the UI displays a change over time of the frequency of raw search queries per respective ones of the plurality of categories.

13. The method of claim 8, wherein the UI comprises a map including at least a subset of the plurality of geographic regions.

14. The method of claim 8, wherein receiving the plurality of raw search queries occurs in substantially real-time as the raw search queries are generated and the UI is updated substantially in real-time.

15. A computer-readable storage medium containing computer-readable instructions that, when executed by one or more processing units, cause the one or more processing units to perform acts comprising:

receiving a plurality of raw search queries including query contents and geolocations;

generating word embeddings for the plurality of raw search queries;

classifying the plurality of raw search queries into one of a plurality of categories based on the query contents and the word embeddings;

determining a number of raw search queries for a plurality of geographic regions for respective ones of the plurality of categories based on results of the classifying and the geolocations;

receiving a selection of a single category of the plurality of categories;

determining a first percentage of search queries in the single category out of all the plurality of categories for all of a first set of geographic regions;

generating a user interface (UI) containing the first set of geographic regions, wherein for individual ones of the plurality of geographic regions included in the first set of geographic regions, a difference between a percentage of searches in the single category for each geographic region in the first set of geographic regions relative to the first percentage of search queries in the single category is indicated by a visual characteristic assigned to the individual ones of the first set of geographic regions;

modifying the UI by changing a zoom level of the UI to show a second set of geographic regions in the UI;

determining a second percentage of search queries in the single category out of all the plurality of categories for the second set of geographic regions; and modifying the UI containing the second set of geographic regions, wherein for individual ones of the second set of geographic regions, a difference between a percentage of searches in the single category for each geographic region in the second set of geographic regions relative to the second percentage of search queries in the single category for the second set of geographic regions is indicated by a visual characteristic assigned to the individual ones of the second set of geographic regions.

16. The computer-readable storage medium of claim 15, wherein the instructions further cause the one or more processing units to perform acts comprising modifying the UI by applying a filter which removes data values for the geographic regions represented in the UI based on a criterion of the filter, wherein the criterion of the filter comprises a socio-economic dimension of the geographic regions represented in the UI.

17. The computer-readable storage medium of claim 15, wherein the raw search queries comprise Internet searches and the geolocations are determined by reverse Internet protocol (IP) lookup.

18. The computer-readable storage medium of claim 15, wherein the raw search queries further include timestamps and the UI displays a change over time of the frequency of raw search queries per respective ones of the plurality of categories.

19. The computer-readable storage medium of claim 15, wherein the UI comprises a map including at least a subset of the plurality of geographic regions.

20. The computer-readable storage medium of claim 15, wherein receiving the plurality of raw search queries occurs in substantially real-time as the raw search queries are generated and the UI is updated substantially in real-time.

* * * * *